(12) United States Patent
Zeng et al.

(10) Patent No.: US 12,540,312 B2
(45) Date of Patent: Feb. 3, 2026

(54) USE OF G007-LK IN PROMOTING OSTEOGENIC DIFFERENTIATION OF DENTAL MESENCHYMAL STEM CELLS AND BONE TISSUE REGENERATION

(71) Applicant: HOSPITAL OF STOMATOLOGY, GUANGZHOU MEDICAL UNIVERSITY, Guangzhou (CN)

(72) Inventors: Sujuan Zeng, Guangzhou (CN); Ying Fang, Guangzhou (CN); Yan Zhang, Guangzhou (CN); Jianwen Li, Guangzhou (CN); Xi Xiang, Guangzhou (CN); Wenyan Huang, Guangzhou (CN); Danyuan Xie, Guangzhou (CN); Ying Ruan, Guangzhou (CN); Keyu Lyu, Guangzhou (CN); Jingjing Yang, Guangzhou (CN); Feng Zhou, Guangzhou (CN); Janak Lal Pathak, Guangzhou (CN); Lijing Wang, Guangzhou (CN)

(73) Assignee: HOSPITAL OF STOMATOLOGY, GUANGZHOU MEDICAL UNIVERSITY, Guangzhou (CN)

( * ) Notice: Subject to any disclaimer, the term of this patent is extended or adjusted under 35 U.S.C. 154(b) by 0 days.

(21) Appl. No.: 19/270,414

(22) Filed: Jul. 15, 2025

(65) Prior Publication Data
US 2026/0022339 A1    Jan. 22, 2026

(30) Foreign Application Priority Data
Jul. 17, 2024   (CN) .......................... 202410957104.5

(51) Int. Cl.
*C12N 5/077*    (2010.01)
*C12N 5/00*     (2006.01)

(52) U.S. Cl.
CPC ......... *C12N 5/0654* (2013.01); *C12N 5/0018* (2013.01); *C12N 2501/999* (2013.01); *C12N 2506/1361* (2013.01)

(58) Field of Classification Search
None
See application file for complete search history.

(56) References Cited

U.S. PATENT DOCUMENTS

2009/0035376 A1    2/2009   Carinci

FOREIGN PATENT DOCUMENTS

| CN | 105886461 A | 8/2016 |
|----|-------------|--------|
| CN | 108588016 A | 9/2018 |
| CN | 114934013 A | 8/2022 |
| CN | 115487185 A | 12/2022 |
| CN | 116716243 A | 9/2023 |
| KR | 20230161580 A | 11/2023 |

OTHER PUBLICATIONS

Huang et al. "Tankyrase inhibition stabilizes axin and antagonizes Wnt signaling" (2009), Nature, vol. 461: 614-620. (Year: 2009).*
Kishi et al. "PARP Inhibitor PJ34 Suppresses Osteogenic Differentiation in Mouse Mesenchymal Stem Cells by Modulating BMP-2 Signaling Pathwy" (2015), Int J Mol Sci, 16: 24820-24838. (Year: 2015).*
Nuha Almasoud et al. "Tankyrase inhibitor XAV-939 enhances osteoblastogenesis and mineralization of human skeletal (mesenchymal) stem cells" Scientific Reports, Oct. 7, 2020.
Shunichi Fujita et al. "Pharmacological inhibition of tankyrase induces bone loss in mice by increasing osteoclastogenesis" Scientific Reports, Oct. 18, 2017.
Wang Xiaocong et al. "Ipriflavone Promotes Proliferation and Mineralization of Human Dental Pulp Stem Cells" Journal of Oral Science Research, vol. 40, No. Apr. 4, 2024.
The First Office Action for China Application No. 202410957104.5, Aug. 20, 2024.
The Notice of Grant for China Application No. 202410957104.5, Oct. 16, 2024.

* cited by examiner

*Primary Examiner* — Teresa E Knight
(74) *Attorney, Agent, or Firm* — Fideli Law PLLC; Qiang Li

(57) ABSTRACT

Disclosed is a use of G007-LK in promoting osteogenic differentiation of dental mesenchymal stem cells and bone tissue regeneration. In vitro experiments of the present application show that G007-LK has the ability to induce SHED to form mineralized nodules and promote osteogenic differentiation; in vivo experiments show that G007-LK pretreatment of SHED for 7 days combined with Geistlich Bio-Oss® collagen bone scaffold can enhance the in vivo osteogenic effect of SHED and promote the subcutaneous ectopic osteogenesis of nude mice, indicating that G007-LK has good osteoinductivity and is a potential osteogenic drug. Therefore, G007-LK can promote osteogenic differentiation of dental mesenchymal stem cells and be applied to bone tissue regeneration.

1 Claim, 15 Drawing Sheets

USE OF G007-LK IN PROMOTING OSTEOGENIC DIFFERENTIATION OF DENTAL MESENCHYMAL STEM CELLS AND BONE TISSUE REGENERATION

CROSS-REFERENCE TO RELATED APPLICATIONS

This application claims priority to Chinese Patent Application No. 202410957104.5, filed on Jul. 17, 2024, the contents of which are incorporated herein by reference.

TECHNICAL FIELD

The present application relates to the technical field of stem cell, and in particular to a use of G007-LK in promoting osteogenic differentiation of dental mesenchymal stem cells and bone tissue regeneration.

BACKGROUND

Bone regeneration and repair has always been a major issue in clinical medicine. Fractures often occur in people's daily lives, and their satisfactory prognosis depends on ideal bone regeneration and repair. Plastic surgery also often involves bone regeneration and repair. To date, how to repair severe bone defects caused by trauma, infection and tumor resection is still one of the difficult problems in clinical practice. Bone transplantation is the second most common tissue transplantation in the world, second only to blood transfusion. Specifically in oral clinical medicine, bone regeneration and repair are of particular significance. Bone transplantation is the most common tissue transplantation in the oral and maxillofacial region. Bone regeneration and repair are essential for restoring oral and maxillofacial deformities caused by malignant tumors, trauma, degenerative diseases and genetics, and are one of the main clinical challenges for oral and maxillofacial surgeons. Reports show that 22.5% to 93% of the population have varying degrees of malocclusion. In the long-term orthodontic treatment process, doctors often need to fully consider the regenerative repair ability of the patient's alveolar bone. In addition, in the treatment of oral diseases such as pulpitis, apical periodontitis and periodontal disease, the patient's dentin formation and regeneration as well as the regenerative repair of the alveolar bone are also important guarantees for a satisfactory prognosis. In view of the great significance of bone regeneration and repair in clinical medicine, including stomatology, it is very important and urgent to actively seek new technical means and improve tissue engineering methods to achieve ideal bone regeneration and repair.

In recent years, the significance of mesenchymal stem cells (MSCs), especially dental stem cells, in bone regeneration and repair has begun to be valued. Stem cells are multipotent cells that have the ability to self-renew in vivo and can differentiate into a variety of cell types including osteoblasts under appropriate conditions. In the past few decades, medical research has conducted extensive and in-depth discussions on the therapeutic potential of mesenchymal stem cells. Mesenchymal stem cells are basal cells that can adhere and grow, and can differentiate into various types of cells such as osteoblasts, chondrocytes and adipocytes. They highly express marker proteins such as CD73, CD90 and CD105, and low or no expression of CD14, CD11b, CD34, CD45, CD19 or CD79 and leukocyte antigen-antigen D-related surface molecules. Since being first discovered in the bone marrow, MSCs have been used to promote bone healing for about twenty years. MSCs also exist in adipose tissue and blood vessel walls, and can be obtained from induced pluripotent cells. In addition, MSCs with differentiation and proliferation potential have been successfully isolated from the dental pulp of permanent teeth, periodontal ligaments, and deciduous teeth. Although the role of many MSCs in bone regeneration and repair remains to be explored, the advantages of dental mesenchymal stem cells have attracted much attention in recent years. In 2000, Gronthos et al. first isolated dental pulp stem cells (DPSCs) from the cell-enriched area of dental pulp tissue and found that DPSCs highly expressed matrix proteins closely related to osteogenesis, such as alkaline phosphatase (ALP), osteocalcin (OCN), and osteopontin (OPN). Since it is common to extract teeth for orthodontic and impacted reasons in clinical practice, dental pulp stem cells are widely available and easy to obtain. DPSCs have a stable phenotype and have very similar phenotypes and functional characteristics to bone marrow mesenchymal stem cells (BMSCs). Dental pulp stem cells can differentiate into various cells such as osteoblasts, chondrocytes, adipocytes and neurons, and have strong lateral differentiation ability. Studies have shown that DPSCs have low expression of major histocompatibility complex-II (MHC-II), low immunogenicity, and have immune negative regulation and immune tolerance, which enable them to escape immune surveillance. These characteristics make the clinical potential of DPSCs not only limited to dental tissue diseases, but also have the potential to be widely used in tissue engineering to repair bone defects. At present, China has successfully carried out the world's first clinical study on DPSCs regenerating whole dental pulp. As a type of DPSCs, stem cells from human exfoliated deciduous teeth (SHED) isolated from deciduous teeth have attracted particular attention in recent years. SHED originates from the ectodermal neural crest and can express multiple markers of MSCs and neural ectodermal stem cells. SHED is located around blood vessels in the dental pulp tissue and has good angiogenic properties. Its telomere length is twice that of permanent tooth DPSCs, showing a high degree of cell stemness and vitality. Compared with permanent tooth DPSCs, SHED has stronger proliferation ability, faster population doubling rate, and expresses higher levels of osteogenic markers OCN and ALP. After transplantation into the body, SHED does not directly differentiate into osteoblasts, but participates in new bone formation by inducing osteoblasts in the body, showing a strong ability to induce bone formation, which is a function that DPSCs and even other dental tissue-derived MSCs do not have. Compared with BMSCs, which are invasive and have limited sources, SHED tissue sources are simpler and less traumatic, with less ethical controversy, and can provide a sufficient number of cells for clinical treatment. In addition, BMSCs of long bones are derived from the mesoderm, while SHED is derived from the ectoderm neural crest. SHED is more suitable for application in the field of tissue engineering of oral and maxillofacial bones. In addition, the previous work of the inventor's research group also proved that SHED has excellent cell proliferation and multidirectional differentiation potential, especially osteogenic differentiation. Therefore, using SHED for basic and translational research will accelerate the acquisition of new technical means and tissue engineering methods for bone regeneration and repair, which has broad scientific significance and application prospects.

G007-LK is an effective inhibitor of TNKS1 and TNKS2, which can inhibit the growth of hepatocellular carcinoma (HCC) cells in a dose-dependent manner. G007-LK down-regulates the level of YAP by upregulating AMOTL1 and AMOTL2 in HCC cell lines. In addition, G007-LK synergistically inhibits the proliferation of HCC cells with MEK and AKT inhibitors. Mouse experiments have found that G007-LK exhibits good pharmacokinetic characteristics, has no effect on changes in duodenal morphology, and has good safety. Chinese Patent CN115487185A discloses the use of G007-LK in the treatment of small cell lung cancer. At present, there are no reports on the role of G007-LK in the osteogenic differentiation of dental mesenchymal stem cells and bone tissue regeneration.

SUMMARY

The purpose of the present application is to overcome the above defects and deficiencies in the related art and provide the application of G007-LK in promoting osteogenic differentiation of dental mesenchymal stem cells and bone tissue regeneration. The present application shows that G007-LK has the ability to induce SHED to form mineralized nodules and promote osteogenic differentiation in vitro; in vivo experiments show that G007-LK has good osteoinductivity and is a potential osteogenic drug.

The above purpose of the present application is achieved through the following technical solutions.

The present application uses the small molecule G007-LK to explore the effects of different concentrations of G007-LK on the proliferation, osteogenic differentiation and mineralization of SHED. G007-LK is further co-cultured with SHED in vitro and then transplanted into the subcutaneous tissue of the back of nude mice in combination with Bio-Oss bone powder to detect the efficacy of G007-LK in promoting SHED osteogenesis in vivo, providing a theoretical basis for the application of G007-LK combined with SHED in bone tissue engineering.

In vitro experimental studies have shown that G007-LK can promote the protein expression level of Axin1 in SHED, and low concentrations of G007-LK can promote the proliferation of SHED, with good biocompatibility, and can promote the gene expression levels of RUNX2, Col-1, ALP, and OCN in SHED and upregulate the protein expression levels of ALP and RUNX2. This shows that G007-LK has the ability to induce SHED to form mineralized nodules and promote osteogenic differentiation.

In vivo experiments have shown that G007-LK pretreatment of SHED for 7 days combined with Geistlich Bio-Oss® collagen bone scaffold can enhance the in vivo osteogenesis of SHED and promote the subcutaneous ectopic osteogenesis in nude mice, indicating that G007-LK has good osteoinductivity and is a potential osteogenic drug.

Therefore, the present application provides the use of G007-LK in promoting osteogenic differentiation of dental mesenchymal stem cells, and the chemical structure of G007-LK is as follows:

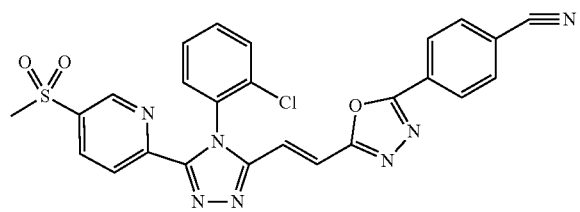 [SMILES: CS(=O)(=O)c1ccc(-c2nnc(/C=C/c3nnc(-c4ccc(C#N)cc4)o3)n2-c2ccccc2Cl)nc1]

The present application also provides the use of G007-LK in preparing a product for promoting osteogenic differentiation of dental mesenchymal stem cells. The chemical structure of G007-LK is shown below:

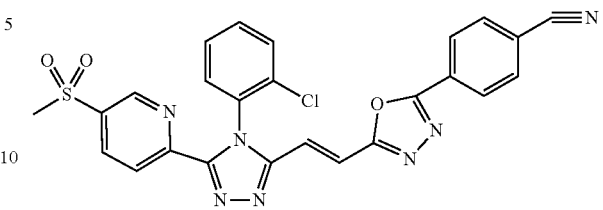

Further, the dental mesenchymal stem cells include but are not limited to deciduous dental pulp stem cells (SHED) separated from deciduous teeth.

Further, G007-LK promotes osteogenic differentiation of dental pulp stem cells through the VEGF pathway.

Further, the working concentration of G007-LK is 0.2 µM to 0.4 µM.

Preferably, the working concentration of G007-LK is 0.2 µM to 0.3 µM. The present application shows that G007-LK can promote the osteogenic differentiation of SHED, and 0.3 µM G007-LK has the strongest effect on promoting osteogenic differentiation of SHED.

Preferably, the product is a drug or a culture medium. For example, the culture medium is an osteogenic differentiation medium.

The present application also provides the use of G007-LK in preparing a preparation for promoting the growth of dental mesenchymal stem cells, and the concentration of G007-LK is 0.01 µM to 0.3 µM, and the induction time is 5 days.

The present application also provides a method for inducing osteogenic differentiation of dental mesenchymal stem cells, which includes using an osteogenic differentiation induction medium containing G007-LK to induce osteogenic differentiation of dental mesenchymal stem cells. The osteogenic differentiation induction medium is a conventional medium in the art, and G007-LK is added as a promoter for inducing osteogenic differentiation. The added concentration of G007-LK is 0.01 µM to 0.3 µM, and the induction time is 7 to 14 days.

The present application also provides the use of dental mesenchymal stem cells pretreated with G007-LK combined with bone powder in the preparation of bone repair products.

The present application also provides a bone repair composition, including dental mesenchymal stem cells pretreated with G007-LK and bone powder. The dental mesenchymal stem cells are obtained by pre-treatment with a mineralization induction medium containing 0.3 µM G007-LK for 7 days.

Compared with the related art, the present application has the following beneficial effects.

The present application provides the use of G007-LK in promoting osteogenic differentiation of dental mesenchymal stem cells and bone tissue regeneration. The in vitro experiments of the present application show that G007-LK has the ability to induce SHED to form mineralized nodules and promote osteogenic differentiation; in vivo experiments show that G007-LK pretreatment of SHED for 7 days combined with Geistlich Bio-Oss® collagen bone scaffold can enhance the in vivo osteogenic effect of SHED and promote the subcutaneous ectopic bone formation effect in nude mice, indicating that G007-LK has good osteoinductivity and is a potential osteogenic drug. Therefore, G007-

LK can promote osteogenic differentiation of dental mesenchymal stem cells and be used in bone tissue regeneration.

DETAILED DESCRIPTION OF THE EMBODIMENTS

The present application is further described below in conjunction with the drawings and specific examples of the specification, but the examples do not limit the present application in any form. Unless otherwise specified, the reagents, methods and devices used in the present application are conventional reagents, methods and devices in the art.

Unless otherwise specified, the reagents and materials used in the following examples are commercially available.

G007-LK, CAS No: 1380672-07-0, purchased from MedChemExpress, USA. The main research routes of the present application are as follows.

Figure 1:
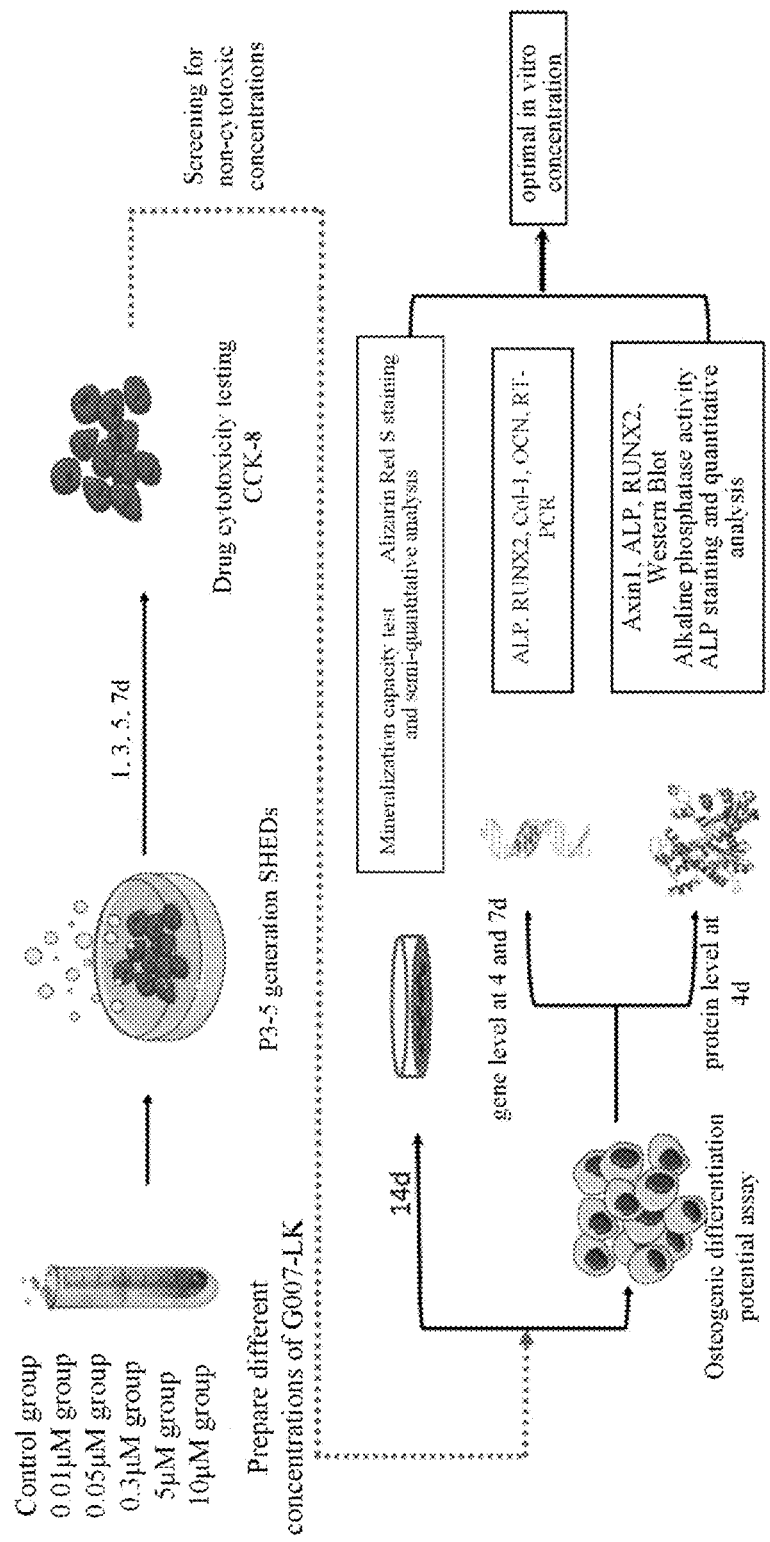
FIG. 1 is a technical roadmap for exploring a role of G007-LK in osteogenic differentiation of SHED.

Research Route 1: the role of G007-LK in osteogenic differentiation of SHED. The technical roadmap is shown in FIG. 1.

Specific experimental plan:

① the freshly extracted healthy retained deciduous teeth were collected, and the pulp tissue was separated and cut into pieces. The pulp tissue was placed in a culture dish and cultured in an incubator at 37° C. and 5% $CO_2$ using α-MEM medium supplemented with 10% fetal bovine serum and 1% penicillin/streptomycin. The cells were observed under an inverted microscope and recorded as primary cells (P0). SHED cells were cultured and divided into two groups. When the cell growth area reached 60% of the bottom area of the culture dish, one group was placed in ordinary culture medium, and the other group was placed in ordinary culture medium containing different concentrations (0.01 μM, 0.05 μM, 0.3 μM) of G007-LK. The CCK-8 method was used to detect the effect on the viability of SHED cells.

② SHED was cultured in the presence or absence of different concentrations of osteogenic induction medium, and the expressions of AXIN1 and osteogenic differentiation-related markers were detected by RT-qPCR and Western blot.

③ cells were collected at different times or stained with alkaline phosphatase or alizarin red, and the osteogenic differentiation of cells was evaluated using relevant methods and techniques.

Figure 2:
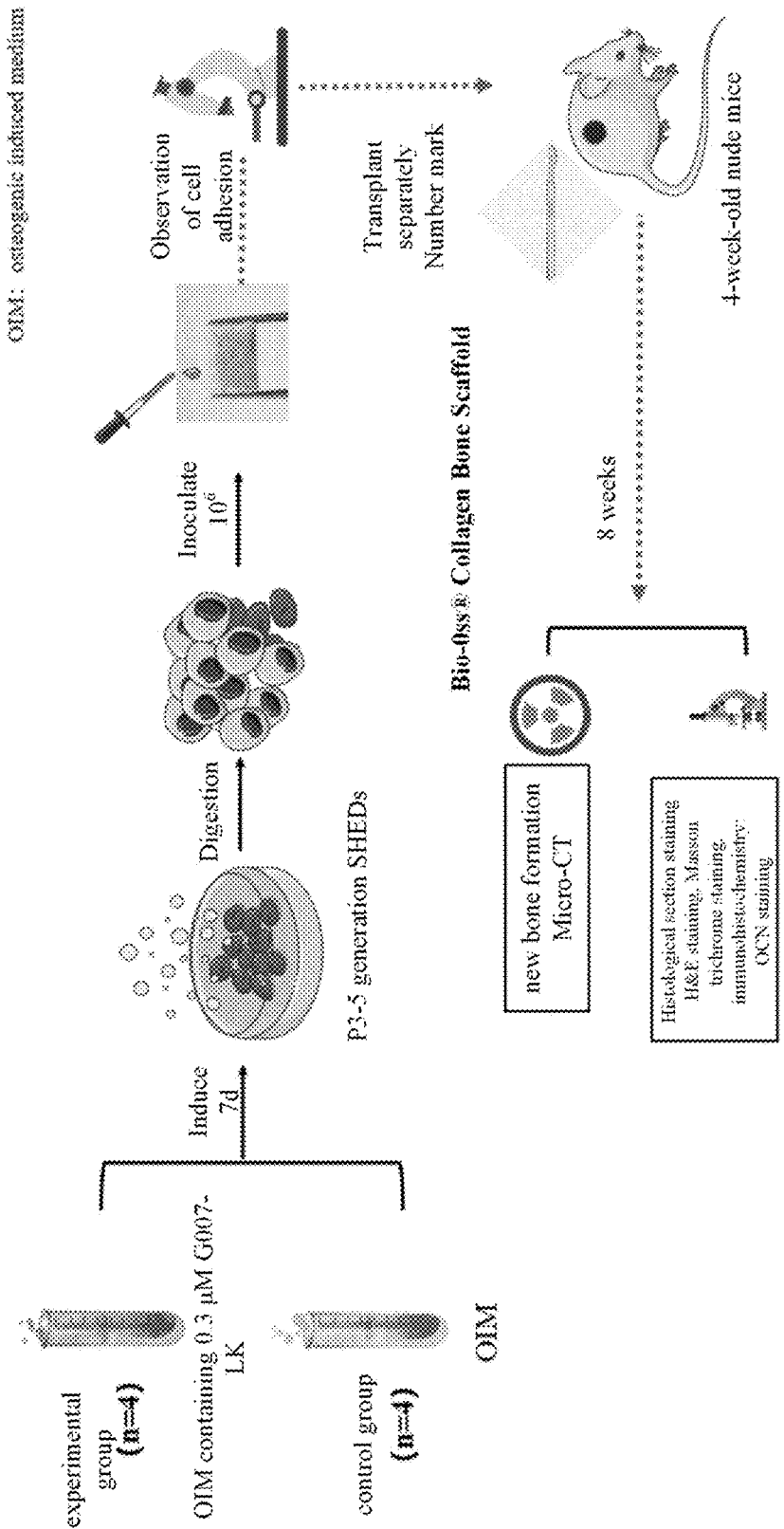
FIG. 2 is a technical roadmap for exploring the role of G007-LK in inducing SHED for bone tissue regeneration in vivo experiments.

④ Research route 2: In vivo experiments explore the role of G007-LK-induced SHED in bone tissue regeneration. The technical roadmap is shown in FIG. 2.

Specific experimental plan: SHED was placed in the presence or absence of osteogenic induction medium, and after 7 days of culture, the cells were loaded into Bio-Oss collagen bone scaffolds and implanted subcutaneously on the back of nude mice. Each group of postoperative mice was randomly divided into 2 groups, and G007-LK and control saline were subcutaneously administered to the surgical area on the back of nude mice every 2 days for 1 week. Samples were collected 4 weeks later, new bone formation was analyzed by Micro-CT and bone tissue morphometry, and histopathological section staining (HE, Masson) was observed. The expression of AXIN1 and osteogenic differentiation markers was detected by immunohistochemical staining, and the effect of G007-LK in promoting bone regeneration in SHED was verified in vivo.

Example 1 Study on the Effect of G007-LK on Osteogenic Differentiation and Mineralization of SHED In Vitro I. Experimental Methods 1. Acquisition of SHED and Preparation of Osteogenic Induced Medium (OM)

The SHED used in the present application was previously obtained and identified by the research team and approved by the Medical Ethics Committee of the Affiliated Stomatological Hospital of Guangzhou Medical University (KY2019008).

Osteogenic induced medium (OM): 10% FBS and 1% double antibody were added to α-MEM, and 10 mM sodium β-glycerophosphate, 50 μg/mL vitamin C and 10 nM dexamethasone were added. Dexamethasone and sodium β-glycerophosphate are stored at −20° C. It is recommended that the vitamin C storage solution be prepared and used immediately, and stored at −20° C. for a short period of time.

2. Preparation of G007-LK

G007-LK was purchased from MedChemExpress, USA. According to the product instructions, 10 mg of G007-LK was dissolved in 1.8869 mL of dimethyl sulfoxide (DMSO) to prepare a 10 mM (5.3 mg/mL) G007-LK storage solution, which was aliquoted and stored at −80° C. Using α-MEM medium containing 10% fetal bovine serum and 1% penicillin/streptomycin, G007-LK was diluted to working concentrations of 0.01 μM, 0.05 μM, 0.3 μM, 5 μM and 10 μM (i.e., α-MEM complete culture medium containing 0 μM, 0.01 μM, 0.05 μM, 0.3 μM, 5 μM and 10 μM G007-LK) according to the IC50 of G007-LK for subsequent in vitro experiments, and it was prepared fresh each time.

3. Cell Proliferation Detection

SHED cells, P3-P5, were cultured in culture flasks and digested with 0.25% trypsin. The complete medium was diluted to a cell suspension with a cell density of $2\times10^4$/mL. 100 μL was inoculated into each well of a 96-well plate and placed in a 37° C., 5% $CO_2$, α-MEM complete medium. After culturing for 1 day in a cell culture incubator, the medium was replaced with α-MEM complete medium containing 0 μM, 0.01 μM, 0.05 μM, 0.3 μM, 5 μM and 10 μM G007-LK, respectively. Six replicate wells were set for each experimental group. The medium was changed every 2 days. 1, 3, 5, and 7 days were set as the detection time points for cell proliferation. The cells were taken out at the corresponding time points, the culture medium was discarded, and the cells were washed twice with sterile PBS buffer. The effect of different concentrations of G007-LK on SHED proliferation was detected by CCK-8 assay. 90 μL of fresh culture medium and 10 μL of CCK8 reagent were added to each experimental well and blank control well in turn, and incubated in a cell culture incubator for 2 h in the dark. The absorbance of the replicate wells of each experimental group at a wavelength of 450 was measured three times by an automatic multifunctional enzyme-linked immunosorbent assay, and the average value was calculated, recorded, analyzed, and compared.

4. Alizarin Red S Staining and Quantification

Alizarin Red S was used to qualitatively analyze the results of mineralized nodules staining, and cetylpyridinium chloride (CPC) was used to semi-quantitatively analyze the ability of G007-LK to induce SHED to form mineralized nodules.
(1) Alizarin Red S Staining
SHED cells were routinely digested, counted, and resuspended using 0.25% trypsin, and seeded in a 48-well plate at a seeding density of $2.5\times10^4$/well. Four replicate wells were set in each group. When the cell growth density reached 70% to 80%, the cell culture medium was replaced with a mineralization induction medium (10 mM sodium β-glycerophosphate, 10 nM dexamethasone, 50 μg/mL vitamin C) (osteoblastic induced medium (OM)) containing 0, 0.01, 0.05, and 0.3 μM G007-LK. The medium was changed every 3 days. The culture medium was discarded on the 14th day, and the cells were washed 3 times with PBS buffer. 200 μL of 4% paraformaldehyde fixative was added to each well and fixed for 20 min to 30 min. After fixation, each group of experimental wells was washed 3 times with deionized water. According to the product instructions, 150 μL of 1% (volume fraction) Alizarin Red S dye solution with a pH of 4.2 was added, let stand in the dark at room temperature for 5 min to 10 min, then aspirate the dye solution, repeat deionized washing until the supernatant is colorless or the color no longer changes, dry at room temperature, and observe and compare under a stereomicroscope.
(2) Semi-Quantitative Analysis of Mineralized Nodules
An appropriate amount of cetylpyridinium chloride powder was calculated and weighed to prepare a 10% (volume fraction) CPC solution. 200 μL of the solution was added to each well of the Alizarin Red S-stained plate after observation and recording, and placed on a shaker for 30 min to 1 h until the mineralized nodules were completely eluted. 20 μL of the eluate was aspirated from each well and added to a 96-well plate. which was diluted 10 times with CPC solution. That is, 180 μL of new CPC solution was added to each 96-well plate in each experimental group, and 200 μL of CPC solution was added to the zero-adjusted well. Finally, the absorbance of each well at a wavelength of 562 was determined using a fully automatic multifunctional enzyme-linked immunosorbent assay, and analyzed and compared.

5. Cell ALP Activity Detection (1) Alkaline Phosphatase Staining
SHED, $2\times10^4$/well seeding density, 48-well plate, cultured to a cell density of 70% to 80%, discarded the original culture medium, replaced with a mineralization induction medium containing 0, 0.01, 0.05, 0.3 μM G007-LK. Four replicate wells were set up in each group, and the medium was changed every 2 to 3 days. After 4 days of culture, the medium in each well was aspirated, and the ALP staining solution was prepared using BCIP/NBT alkaline phosphatase colorimetric kit according to the product instructions to qualitatively detect the ALP activity. For specific steps, refer to the instructions of the alkaline phosphatase staining kit: fix with 4% paraformaldehyde universal tissue fixative for 30 minutes, and gently rinse with PBS 2-3 times. After absorbing the PBS buffer in each well as much as possible, add 120 μL to 150 μL ALP staining solution, keep it away from light, and let it stand at room temperature for 5 min to 10 min (up to 24 h), then absorb the ALP staining solution, carefully rinse with deionized water 2 to 3 times, and be careful not to poke the bottom of the well plate, observe under a stereo microscope, take pictures, and analyze the positive area with Image J.
(2) Quantitative Detection of ALP Activity
SHED was inoculated at a density of $2\times10^4$/well in a 48-well plate. After culturing to a cell density of 70%-80%, the original culture medium was discarded. Four replicate wells were set up in each group and replaced with a mineralization induction medium containing 0 μM, 0.01 μM, 0.05 μM and 0.3 μM G007-LK. The medium was changed every 2 to 3 days. After culturing for 4 days, the culture medium was discarded and the cells were rinsed 3 times with PBS buffer. 100 μL of pre-prepared 1% (volume fraction) cell lysis solution (Triton) was added to each experimental well and lysed on ice for 0.5 h. The lysed cells were collected into sterile EP tubes, marked, and centrifuged at 13,000 rpm and 4° C. for 10 min. 50 μL of the supernatant was taken respectively, and the ALP content and total protein content in the supernatant were determined using the AKP detection kit and the BCA quantitative detection kit. The absorbance of each well of the test solution at wavelengths of 520 and 562 was measured using a fully automatic multifunctional enzyme-linked immunosorbent assay, and the standard curve formula was calculated. The ratio of ALP concentration to total protein concentration was quantitatively calculated according to the product instructions to obtain the ALP activity of each group in U/gprot.

6. Real-Time PCR Method to Detect the Relative Expression of Related Genes in the Osteogenic Differentiation Process of SHED SHED was inoculated in a 6-well plate at a seeding density of $1\times10^5$/well. After culturing to a cell density of 70%-80%, the original culture medium was discarded and replaced with a mineralization induction medium containing 0 μM, 0.01 μM, 0.05 μM and 0.3 μM G007-LK. Four replicate wells were set up in each group, and the medium was changed every 2-3 days. After culturing for 4 days and 7 days, the culture was terminated, and the cells were washed with PBS buffer 3 times, and the following operations were performed.

(1) Total RNA Extraction and Reverse Transcription PCR
1) Total RNA was Extracted from Cells and the Following Operations were Performed in a Clean Bench Disinfected with Ultraviolet Light:
  a) cells were treated with 1 mL/well of Trizol (Takara, Japan, RNA rapid extraction reagent) and let stand at room temperature for 10 minutes. If the cell lysate is too viscous at this time, ultrasonic treatment or multiple beatings can be used until the RNA extraction solution meets the experimental requirements. The cell lysate was transferred to an RNase-free EP tube. 200 μL of chloroform was added to each EP tube and mixed well, vortex for 20 seconds, let stand at 4° C. for 5 minutes, and centrifuged at 4° C., 13,000 rpm for 15 minutes. It can be observed that the liquid in the EP tube is divided into three layers: RNA is in the upper layer, which is colorless and transparent water; the middle layer is a white membrane-like substance layer containing protein; the lower red layer is a layer containing organic solvent. Carefully pipette the upper aqueous phase (400 μL) into a new EP tube, number and label the new EP tube.
  b) 400 μL of isopropanol was added, the EP tube was mixed upside down, let stand at 4° C. for 10 min, and centrifuged at 13,000 rpm, 4° C. for 15 min. The unpurified total RNA precipitates on the bottom wall of the tube and appears white.
  c) total RNA purification: discard the supernatant in each EP tube, keep the precipitate, prepare 75% ethanol with anhydrous ethanol, add 1 mL to each EP tube, vortex for 30 s, centrifuge at 4° C., 7,000 rpm for 5 min, discard the supernatant in each EP tube, add 1 mL of anhydrous ethanol to each EP tube, vortex for 30 s, centrifuge again at 4° C., 7,000 rpm for 5 min, absorb the supernatant in each EP tube as much as possible, turn it upside down on a paper towel disinfected tube with ultraviolet light in the clean bench, and air dry for 10 min or until there is no residual liquid in each tube.
  d) 10-20 μL of enzyme-free water was added to each EP tube to dissolve the purified total RNA.

2) Determination of Total RNA Purity and Concentration
The UV spectrophotometer was zeroed and calibrated with enzyme-free water. 1 μL of the extracted total RNA sample was taken and measured three times to obtain the average value, and record the total RNA concentration. The purity of RNA can be known by the ratio of the OD values of the sample at 260 nm and 280 nm measured by the instrument. If the ratio is between 1.8 and 2.0, it indicates that the total RNA purity of the sample is high and meets the experimental requirements of Real-time PCR.

3) Removal of Genomic DNA Reaction
The reaction mixture was prepared on ice according to the following ingredients in Table 1.

TABLE 1

| reaction mixture system | |
|---|---|
| Reagent | Usage |
| 5 × DNA Eraser Buffer | 2.0 μL |
| gDNA Eraser | 1.0 μL |
| Total RNA | 1 |
| RNase Free dH$_2$O | up to 10 μL |

After mixing, keep the mixture at 42° C. for 2 minutes.

4) RNA Reverse Transcription Reaction
The reaction solution was prepared on ice to prepare the reverse transcription reaction system according to Table 2 below.

TABLE 2

| reverse transcription reaction system | |
|---|---|
| Reagent | Usage |
| Reaction solution of Step 3) | 10.0 μL |
| PrimeScript RT Enzyme Mix | 1.0 μL |
| RT Primer Mix | 1.0 μL |
| 5 × PrimeScript Buffer | 4.0 μL |
| RNase Free dH$_2$O | 4.0 μL |

After mixing, the samples were kept at 37° C. for 1 min, incubated at 50° C. for 60 min, and incubated at 70° C. for 15 min to inactivate the enzyme. The cDNA samples were diluted to 100 μL/tube, and the cDNA concentration of each sample was measured and recorded. The samples were immediately transferred to −20° C. or −80° C. refrigerator for short-term storage.

(2) Real-Time PCR Method was Used to Detect the Relative Expression of Osteogenesis-Related Genes
1) Primer Design
The primers were synthesized by China Jierui Company.
2) System
The required amount of cDNA for each sample reverse transcription product is 2.0 μL, and the Real Time PCR experiment is performed on a fluorescent quantitative PCR instrument using the SYBR Premix Ex Taq kit according to Table 3.

TABLE 3

| Real Time PCR reaction system | |
|---|---|
| Reagent | Usage |
| SYBY Premix Ex TaqII (2X) | 12.5 μL |
| PCR Forward Primer (10 μM) | 1.0 μL |

TABLE 3-continued

Real Time PCR reaction system

| Reagent | Usage |
|---|---|
| PCR Reverse Primer (10 μM) | 1.0 μL |
| cDNA solution | 2.0 μL |
| RNase Free H$_2$O | 8.5 μL |

3) Real-time PCR reaction conditions: PCR reaction was performed in a real-time fluorescence quantitative PCR instrument, and the reaction program was set as follows: 95° C., 30 s; 60° C., 1 min, 40 cycles.

4) Real-time PCR result analysis: 3 replicate wells were set for the same sample (technical replication), the Ct value of each sample in the control group and each experimental group was measured, and the relative expression of the target gene ($2^{-\Delta\Delta Ct}$) was calculated. The experiment was repeated 3 times (experimental replication).

Note: Axin1: Axin 1; ALP: Alkaline phosphatase; Col-1: Type I collagen; RUNX2: Runt-related transcription factor-2; OCN: Osteocalcin; COX-2: Cyclooxygenase-2; GAPDH: Glycerol-3-phosphate dehydrogenase 7. Western Blot Detection SHED was inoculated in a 6-well plate at a seeding density of 1×10$^5$/well. After culturing to a cell density of 70% to 80%, the original culture medium was discarded. Four replicate wells were set up in each group and replaced with mineralization induction medium containing 0 μM, 0.01 μM, 0.05 μM and 0.3 μM G007-LK. The medium was changed every 2 to 3 days. After 4 days, the original culture medium was aspirated, the cells were rinsed with PBS buffer 3 times, and the following operations were performed:

Protein extraction: rinse with pre-cooled PBS buffer for 3 times, try to dry the PBS in the well plate, prepare 1% (volume fraction) PMSF, the preparation method is: RIPA lysis buffer:protease inhibitor mixture=99:1. Add 100-120 μL to each well, lyse on ice for 30 min, collect the lysed mixed solution into EP tubes, mark with numbers, and centrifuge at 4° C., 13,000 rpm for 15 min. As can be seen, white precipitates as impurities appeared on the bottom wall of each EP tube. The supernatant is the total protein of each group. The BCA kit described in the introduction is used to detect the concentration of the extracted total protein, calculate the loading buffer required for each sample according to the BCA value, mix, heat in a metal bath for 15 min, and immediately transfer to a −20° C. or −80° C. refrigerator for short-term storage.

Electrophoresis: prepare SDS-PAGE gel, set the sample loading amount (15 μg) per well, set the concentration gel to 80V constant voltage, set the separation gel to 120V constant voltage, and start electrophoresis.

Transfer: after the electrophoresis is completed, the PVDF membrane was activated with an appropriate amount of methanol to make it carry positively charged groups, and then the proteins separated on the SDS-PAGE gel were transferred to the activated PVDF membrane using a Bio-Rad membrane transfer instrument at a constant current of 330 mA.

Membrane blocking and antibody incubation: After the membrane transfer was completed, the PVDF membrane was blocked with a rapid blocking solution for 0.5 hours or overnight at 4° C. according to the experimental requirements. After blocking, the membrane was rinsed with PBST for 5 minutes, the rinse solution was discarded, and the membrane was dried. The primary antibody of the target protein prepared according to the proportion in the instructions in advance was added for incubation, incubated at 4° C. overnight or shaked at 37° C. for 1 hour. After the incubation of the primary antibody is completed, rinse on a TBST shaker for 3 times, 10 minutes each time. Prepare the secondary antibody, add it to the incubation box, and incubate on a shaker at room temperature for 1 hour. Rinse 3 times with TBST shaker, 10 min each time, and dry the remaining Western blot washing solution. ECL chemical developing luminescent solution was prepared according to the usage instructions, and the PVDF membrane containing the target protein was placed in the luminescent solution for 1 min under light-proof conditions, and removed with flat-head forceps. The excess luminescent solution was aspirated, developed with a developer, and the bands were qualitatively observed and recorded. The bands on the membrane were quantitatively analyzed and compared using Image J image processing software.

8. Statistical Analysis

All data were expressed as mean±standard deviation. SPSS 26.0 statistical software was used for two independent sample t-tests and One-Way ANOVA analysis. Dunnett's method was used for comparisons between the experimental group and the control group, and Turkey's method was used for pairwise comparisons between the groups. The test level was $\alpha=0.05$, and $P<0.05$ indicated that the difference was statistically significant.

II. Results

1. Cytotoxicity Test Results of G007-LK

Figure 3:
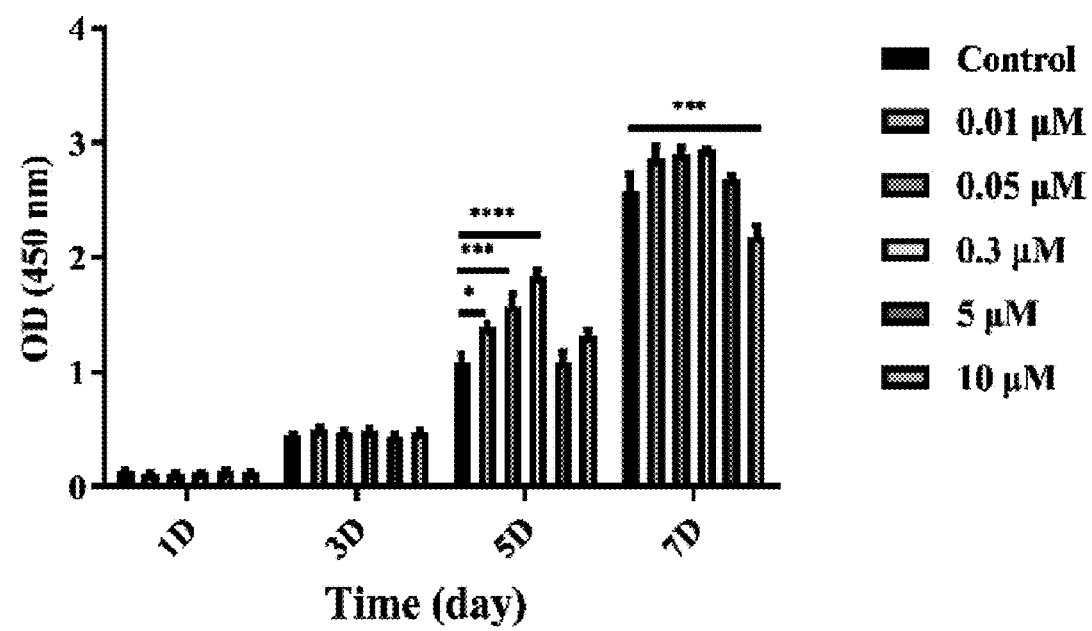
FIG. 3 is the results of CCK-8 cytotoxicity experiment of G007-LK and SHED co-cultured ($P<0.01$; *$P<0.001$).

The results of CCK-8 cytotoxicity test showed (FIG. 3) that compared with the control group, at 1 and 3 days, the culture medium containing 0.01, 0.05, 0.3, 5, and 10 μM G007-LK did not affect the proliferation of SHED ($P>0.05$); at 5 days, the culture medium containing 0.01, 0.05, and 0.3 μM G007-LK promoted the proliferation of SHED ($P<0.05$), and there was no statistical difference in OD values between the 5 and 10 μM G007-LK groups and the control group ($P>0.05$). At 7 days, the OD values of the 0.01, 0.05, and 0.3 μM G007-LK groups were higher than those of the control group, but the difference was not statistically significant ($P>0.05$). The OD value of the 5 μM G007-LK group was lower than that of the control group, but the difference was not statistically significant ($P>0.05$). The OD value of the 10 μM G007-LK group was lower than that of the control group, and the difference was statistically significant ($P<0.05$). It can be seen that low concentrations of G007-LK (0.01-0.3 μM) have no cytotoxicity to SHED, and even at 5 days, low concentrations of G007-LK can enhance the proliferation ability of SHED.

2. Mineralized Nodule Staining and Semi-Quantitative Analysis Results

Figure 4:
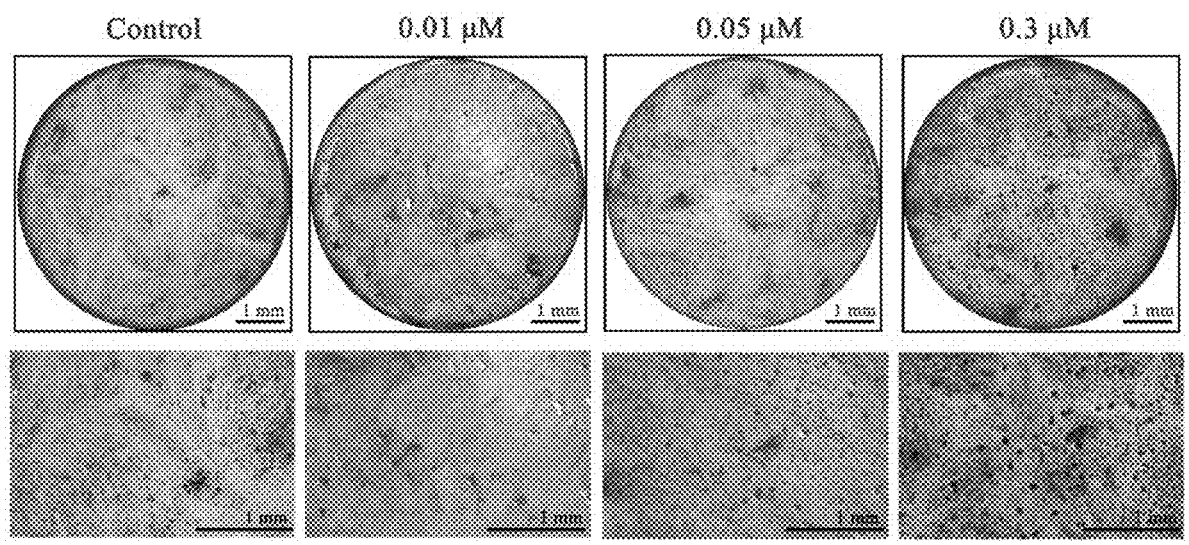
FIG. 4 is an Alizarin Red S staining image of mineralized nodules of G007-LK after co-culture with SHED for 2 weeks.
Figure 5:
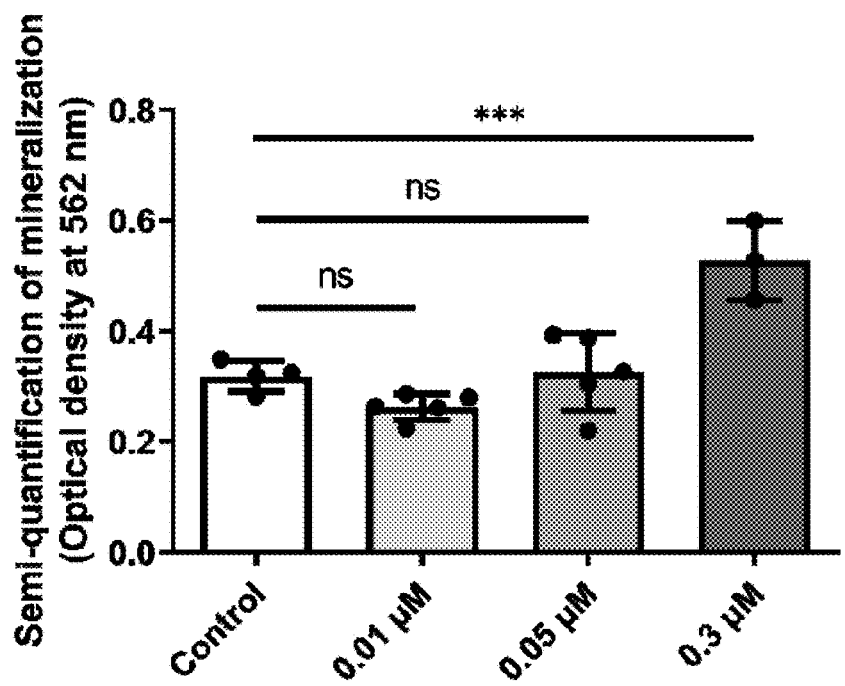
FIG. 5 shows the semi-quantitative results of mineralized nodules after co-culture of G007-LK and SHED (ns: not statistically significant, **$P<0.01$).

After SHED and G007-LK were co-cultured for 14 days, Alizarin Red S staining was performed. The results are shown in FIG. 4. More and larger mineralized nodules were formed in the 0.05 and 0.3 μM G007-LK groups, while fewer mineralized nodules were formed in the 0.01 μM G007-LK group and the control group. The semi-quantitative analysis results of cetylpyridinium chloride (FIG. 5) showed that the mineralization amount in the 0.3 μM G007-

LK group was significantly higher than that in the control group, and the result was statistically significant (P<0.05). There was no statistically significant difference in the mineralization amount between the 0.01 and 0.05 μM G007-LK groups and the control group (P>0.05). The mineralization amount in the 0.3 μM G007-LK group was significantly higher than that in the 0.01 and 0.05 μM G007-LK groups (P<0.05). Based on the results of qualitative staining and semi-quantitative analysis of mineralized nodules by Alizarin Red S, 0.3 μM G007-LK has the ability to induce the formation of mineralized nodules in SHED.

3. Effect of G007-LK on ALP Activity of SHED

Figure 6:
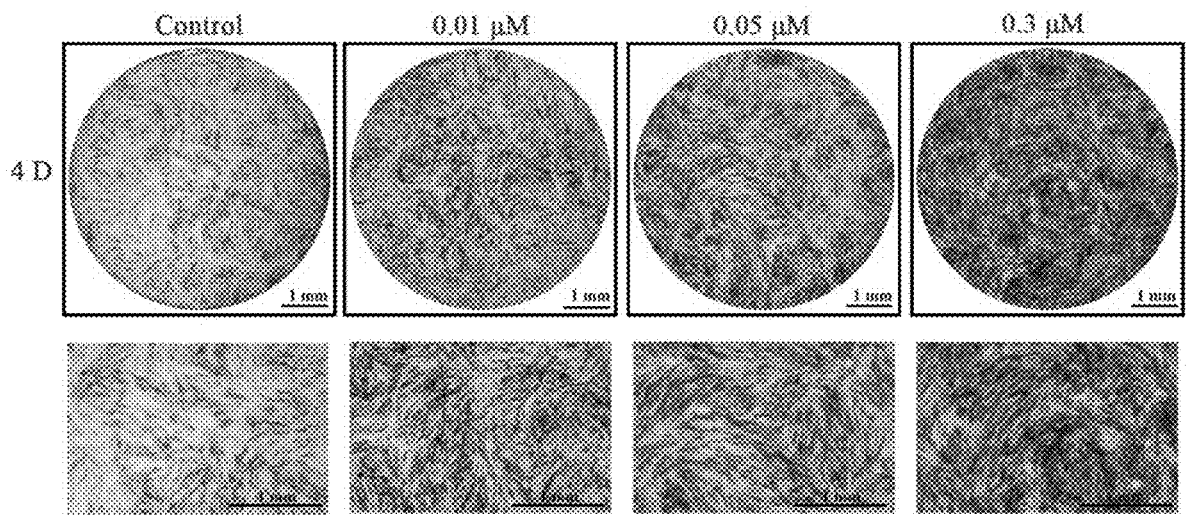
FIG. 6 is an ALP staining image of G007-LK co-cultured with SHED.
Figure 7:
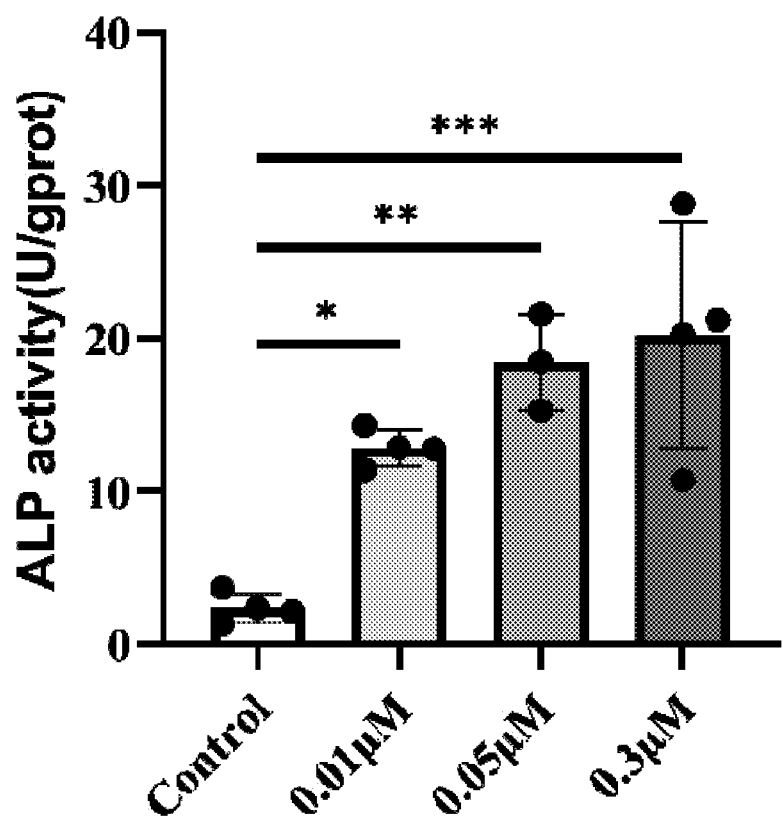
FIG. 7 shows the effect of G007-LK on SHED ALP activity (*$P<0.05$ $P<0.01$ *$P<0.001$).

FIG. 6 shows the results of ALP staining. It can be seen from the results that at 4 days, the ALP staining of the 0.01 μM, 0.05 μM and 0.3 μM G007-LK groups was deeper than that of the control group, and the ALP staining of the 0.3 μM G007-LK group was the deepest. The trend of the quantitative detection results of ALP activity was consistent with the staining results. As shown in FIG. 7, the ALP activity value (U/gprot) of the 0.3 μM G007-LK group was higher than that of the control group, with statistical significance (P<0.05). The ALP activity of the 0.01 and 0.05 μM G007-LK groups was slightly higher than that of the control group, but the results were not statistically significant (P>0.05). According to the results of ALP qualitative staining and activity quantitative detection, 0.3 μM G007-LK can promote the ALP expression of SHED.

4. Expression of SHED Osteogenic Differentiation-Related Genes

Figure 8:
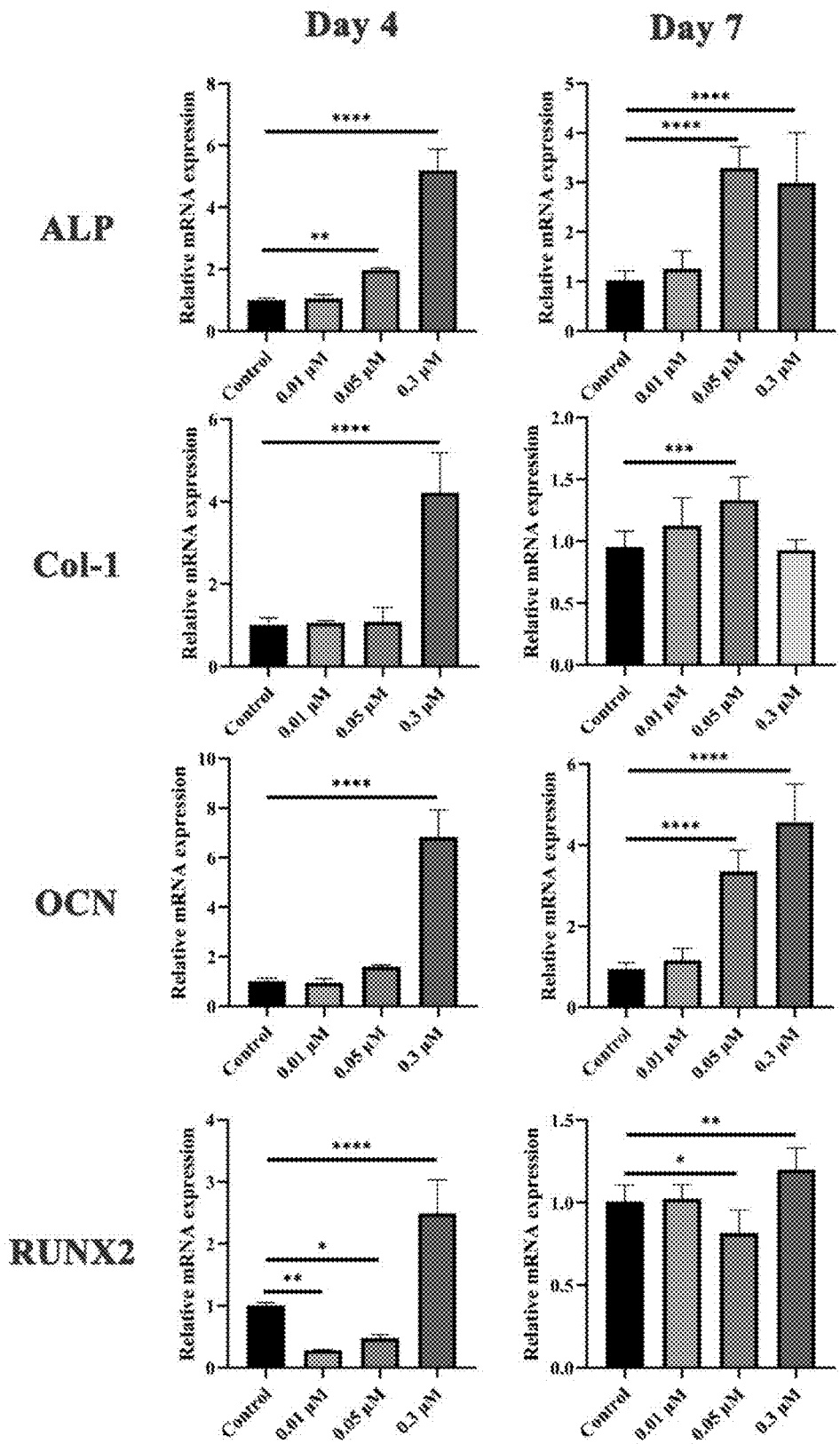
FIG. 8 shows the effect of G007-LK on the relative expression of SHED osteogenic differentiation genes.

Real-time PCR was used to detect the relative expression of SHED osteogenic differentiation genes. The results are shown in FIG. 8. For ALP gene expression, at 4 and 7 days, compared with the control group, 0.05 and 0.3 μM G007-LK groups expressed higher ALP, and the difference was statistically significant (P<0.05). The ALP gene expression of the 0.01 μM G007-LK group was slightly higher than that of the control group, but the difference was not statistically significant (P>0.05). For Col-1 gene expression, at 4 days, 0.3 μM G007-LK group was higher than the control group, and the difference was statistically significant (P<0.05). The relative expression of Col-1 gene in the 0.01 and 0.05 μM G007-LK groups was not statistically different from that in the control group (P>0.05). At 7 days, the expression of Col-1 gene in the 0.05 μM G007-LK group was higher than that in the control group, and the difference was statistically significant (P<0.05). The expression of Col-1 gene in the 0.01 μM G007-LK group was slightly higher than that in the control group, and the expression of Col-1 gene in the 0.3 μM G007-LK group was slightly lower than that in the control group, but the differences were not statistically significant (P>0.05). At 4 days, the expression of OCN gene in 0.3 μM G007-LK group was higher than that in control group, and the difference was statistically significant (P<0.05). There was no statistical difference in the expression of OCN gene between 0.01 μM, 0.05 μM G007-LK groups and the control group (P>0.05). At 7 days, the expression of OCN gene in 0.05 μM G007-LK group and 0.3 μM G007-LK group was higher than that in the control group, and the difference was statistically significant (P<0.05). There was no statistical difference in the expression of OCN gene between 0.01 μM G007-LK group and control group (P>0.05). As for RUNX2 gene expression, the RUNX2 gene expression in the 0.3 μM G007-LK group was higher than that in the control group at 4 and 7 days (P<0.05). The RUNX2 gene expression in the 0.01 and 0.05 μM G007-LK groups was lower than that in the control group at 4 days (P<0.05), and the difference was statistically significant (P<0.05). At 7 days, the difference in RUNX2 gene expression between the 0.01 and 0.05 μM G007-LK groups and the control group was insignificant after statistical analysis (P>0.05). In summary, the Real-time PCR detection results showed that in terms of the expression levels of genes related to promoting osteogenic differentiation of SHED, 0.3 μM G007-LK group>0.05 μM G007-LK group>0.01 μM G007-LK group>control group, G007-LK can promote osteogenic differentiation of SHED, among which 0.3 μM G007-LK has the strongest effect on promoting osteogenic differentiation of SHED.

5. Western Blot Test Results

Figure 9:
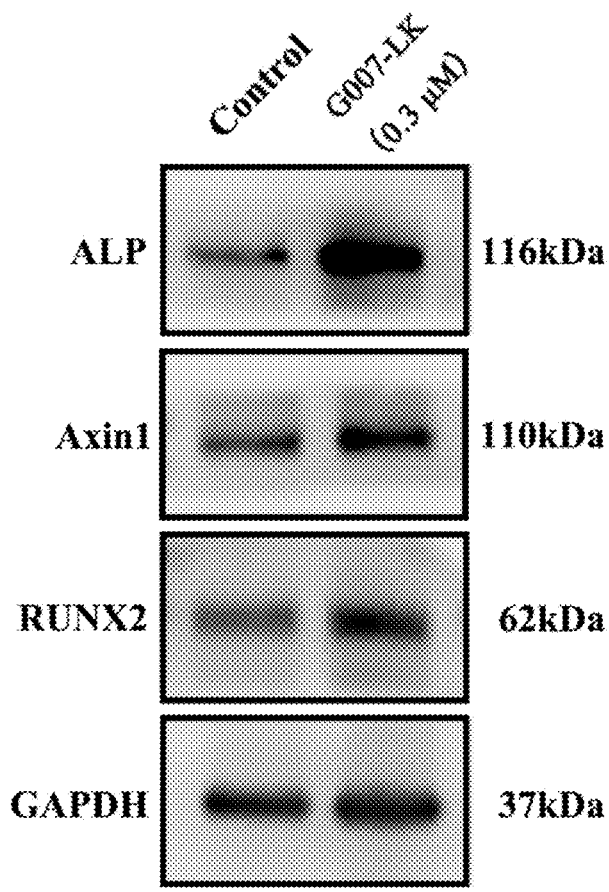
FIG. 9 shows the expression results of Axin1, ALP and RUNX2 after SHED was treated with G007-LK for 4 days.
Figure 10:
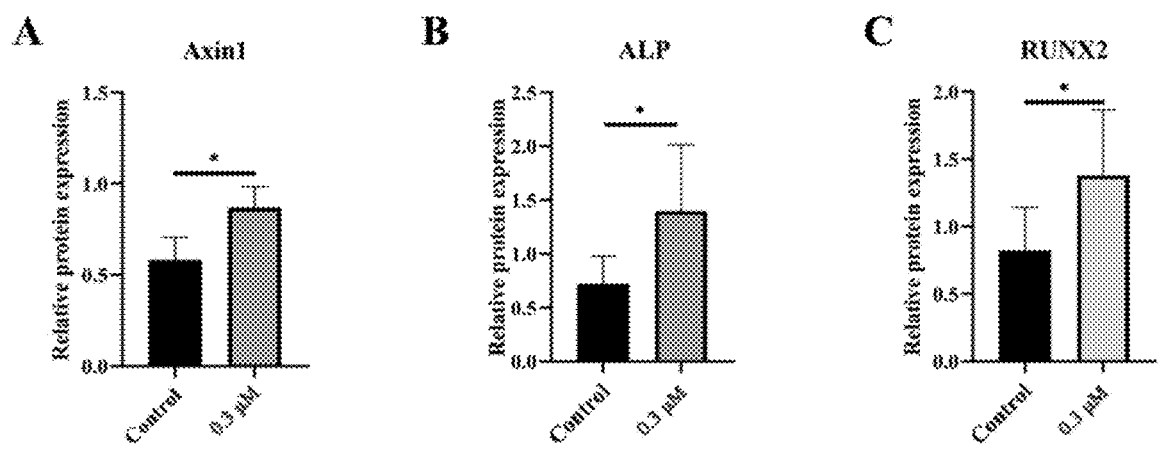
FIG. 10 shows the expression results of Axin1, ALP and RUNX2 after SHED was treated with G007-LK for 4 days (*$P<0.05$), A of FIG. 10 is the relative expression result of Axin1 protein, B of FIG. 10 is the relative expression result of ALP protein, and C of FIG. 10 is the relative expression result of RUNX2 protein.
Figure 11A:
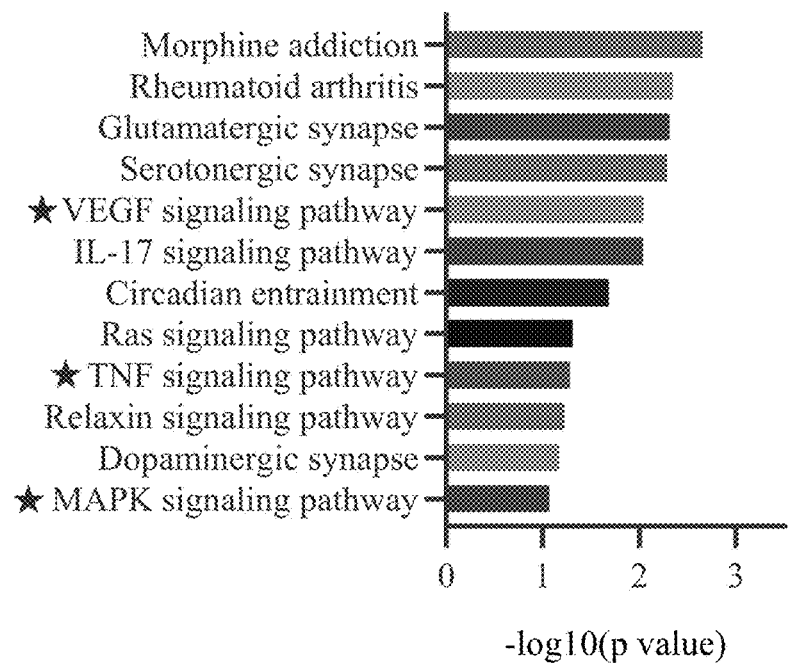
FIG. 11A is the results of KEGG pathway enrichment analysis.
Figure 11B:
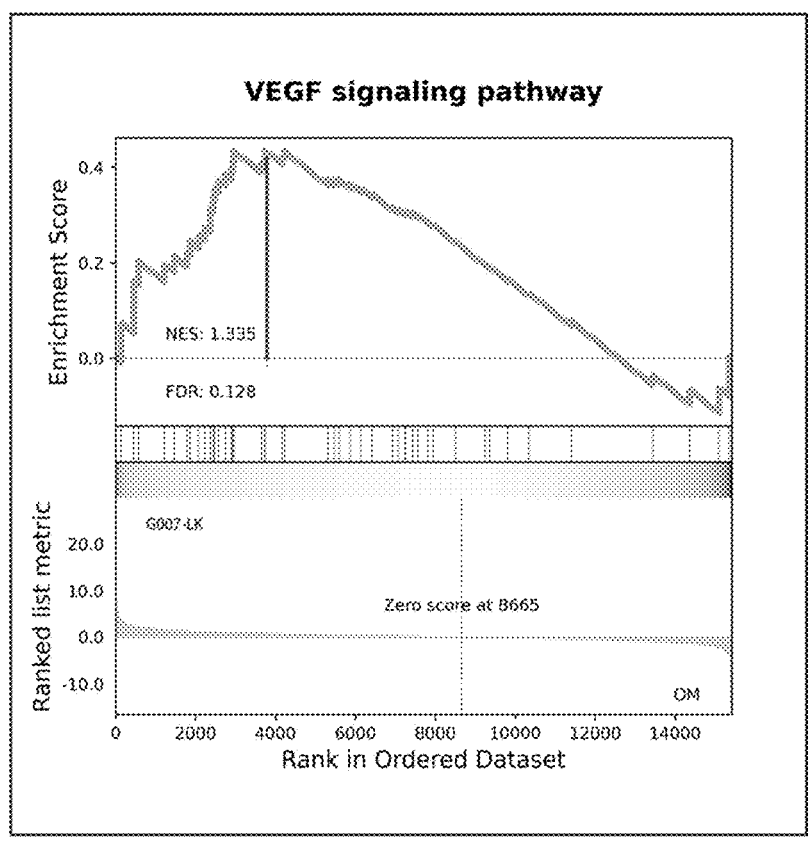
FIG. 11B is the details of VEGF signaling pathway in the results of gene set enrichment analysis (GSEA)
Figure 11C:
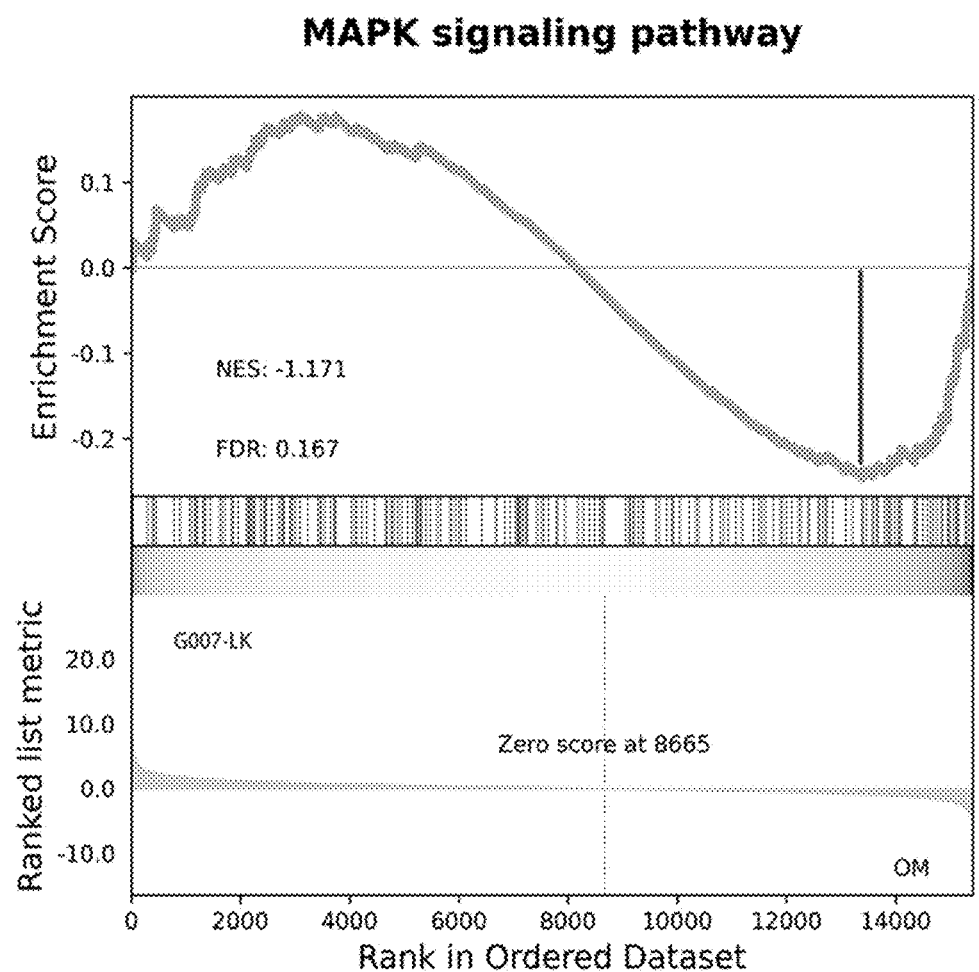
FIG. 11C is the details of genomic MAPK signaling pathway.
Figure 11D:
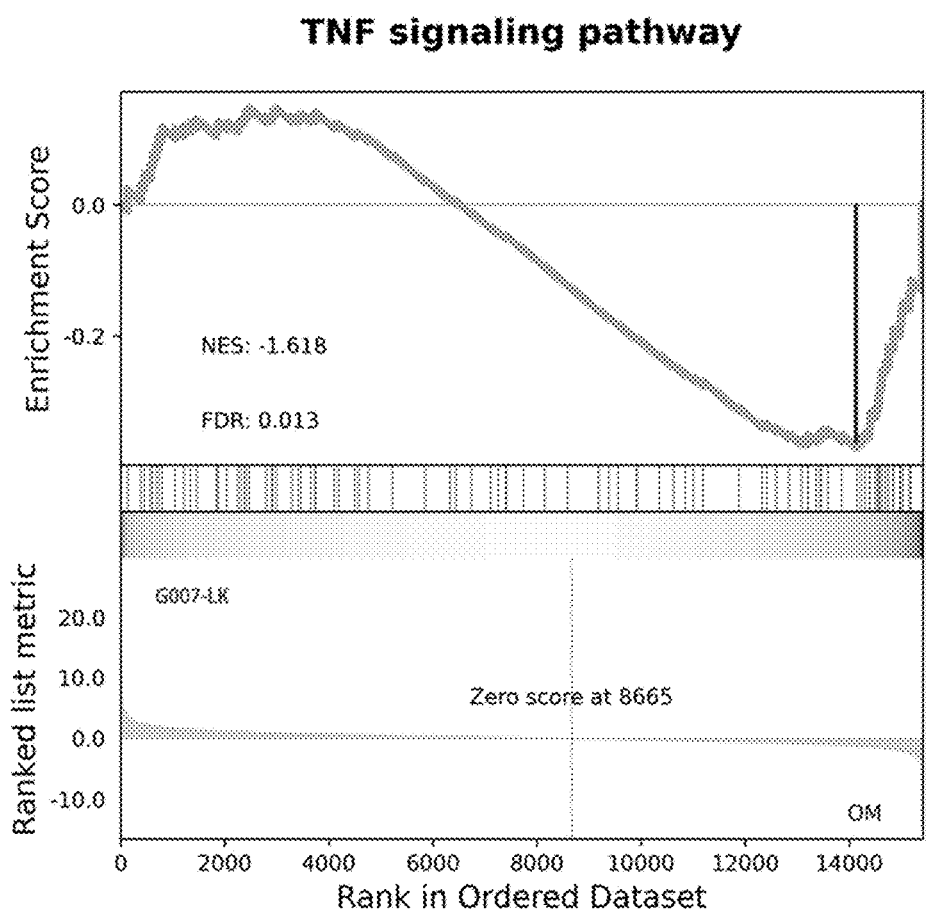
FIG. 11D is the details of genomic TNF signaling pathway.
Figure 11E:
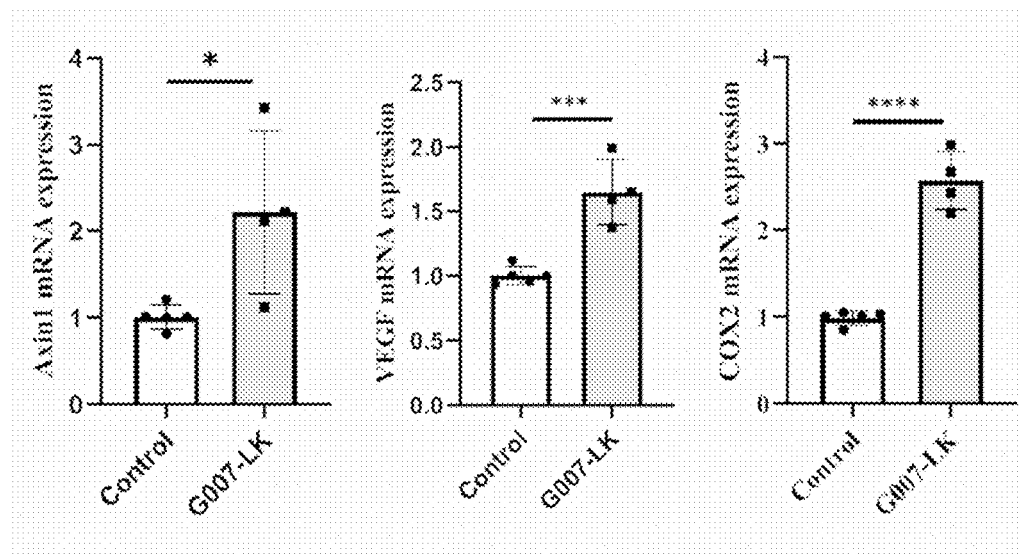
FIG. 11E is the expression analysis of Axin1, VEGF and COX2.

The results of Western blot test are shown in FIG. 9 and FIG. 10. At 4 days, the protein expressions of ALP, RUNX2 and Axin1 in the 0.3 μM G007-LK group were higher than those in the control group, and the differences were statistically significant (P<0.05). This shows that G007-LK can positively regulate the expression of Axin in SHED, promote the expression of osteogenic-related proteins ALP and RUNX2, and thus affect the osteogenic differentiation of SHED.

In summary, Axin, as a kind of intracellular framework protein, has been proven in recent years to form a complex with important effector proteins of bone metabolism-related pathways such as β-catenin, Smad3, and AMPK. The present application proves that G007-LK can upregulate the Axin1 level of SHED, indicating the function that G007-LK can perform in SHED.

In bone tissue engineering, only good proliferation ability can enable the implanted seed cells to function and achieve the purpose of repairing trauma and reconstructing function. This shows that the applied osteogenic drugs cannot inhibit the normal proliferation process of seed cells. In the proliferation experiment of the present application, the results showed that the cell activity of the G007-LK groups at various concentrations (0.01, 0.05, 0.3 μM) at 1 and 3 days was similar to that of the control group, and the difference was not statistically significant. At 5 and 7 days, the low concentration (0.01, 0.05, 0.3 μM) G007-LK group promoted SHED proliferation. At 7 days, the 5 and 10 μM G007-LK groups had an inhibitory effect on SHED proliferation, which shows that a certain concentration of small molecule G007-LK does not affect SHED proliferation, and high concentration G007-LK inhibits SHED proliferation. The reason is that some studies have shown that G007-LK negatively regulates the activation of the Wnt/β-catenin pathway by upregulating the expression level of Axin1 in rat-derived BMSCs, and this pathway has a positive regulatory effect on cell proliferation. Therefore, this experiment used a low concentration of G007-LK for research.

Endogenous and exogenous factors affect the specific microenvironment of stem cells and also affect the differentiation of stem cells. In the cell mineralization experiment, the results of Alizarin Red S staining showed that as the concentration of G007-LK increased, the Alizarin Red staining became darker, and the mineralized nodules formed by SHED increased. The 0.3 μM G007-LK group had the strongest effect. ALP qualitative staining also found that when the concentration of G007-LK was 0.3 μM, ALP staining was the deepest. The quantitative results of ALP activity were consistent with the trend of qualitative results.

These results show that G007-LK at a concentration of 0.3 µM shows excellent osteoinduction in vitro. G007-LK has a positive regulatory effect on the proliferation and mineralization of stem cells and can play a positive role in the process of tissue repair.

There are specific changes in the expression of genes and proteins during the osteogenic differentiation of stem cells. Alkaline phosphatase is one of the important indicators for detecting the early activity of osteoblasts, and its increased activity indicates that bone formation is in an active state. Col-1 is expressed in the early osteogenic differentiation stage and before mineral deposition. Studies have shown that OCN is highly expressed in mature osteoblasts and is the most abundant non-collagen protein in the extracellular matrix of bones. Its presence promotes the mechanical properties and formation rate of bones. Studies have shown that RUNX2 also plays an important role in reflecting the maturity of osteoblasts. It can promote the proliferation of osteogenic precursor cells and promote the osteogenic differentiation of MSCs. The expression of RUNX2 is specific in different stages of osteogenic differentiation. RUNX2 is weakly expressed in undifferentiated mesenchymal stem cells, while the expression of RUNX2 in pre-osteoblasts begins to be upregulated. The peak of RUNX2 expression occurs at the stage when osteoblasts are about to mature, and finally RUNX2 expression is downregulated in the mature stage of osteoblasts. The results of the present application show that 0.3 µM G007-LK can upregulate the gene expression of ALP, Col-1, OCN, and RUNX2 of SHED and the protein expression of ALP and RUNX2. It can be seen that a certain concentration of small molecule G007-LK can promote the osteogenic differentiation of SHED and induce it to perform osteogenic function.

The above results confirm that G007-LK can promote the protein expression level of Axin1 in SHED, low concentration of G007-LK can promote the proliferation of SHED, has good biocompatibility, and can promote the gene expression level of RUNX2, Col-1, ALP, OCN in SHED and upregulate the protein expression level of ALP and RUNX2, and has the ability to induce SHED to form mineralized nodules and promote osteogenic differentiation.

Example 2 Exploring the Molecular Mechanism of Osteogenic Differentiation of SHED Treated with G007-LK In order to explore the molecular mechanism of osteogenic differentiation of G007-LK-treated SHED, the present application subsequently performed RNA sequencing and bioinformatics analysis on G007-LK-treated SHED (G007-LK group) and osteogenic medium-treated SHED (control group). The results are shown in FIG. 11A, FIG. 11B, FIG. 11C, FIG. 11D and FIG. 11E. Compared with the control group, the present application found 196 differentially expressed genes (DEGs) in the G007-LK group (A). The volcano plot showed that 69 genes were upregulated and 127 genes were downregulated (converted change ≥2.0; P (Corr) <0.05), represented by red and blue, respectively (B). The present application analyzed the significantly upregulated genes and displayed the top 20 genes. There are 8 genes related to osteogenesis, namely ADAM28, SerpinB2, MMP1, SLC16A6, NOX4, PTGS2 (COX-2), PDK4 and MMP3. KEGG pathway enrichment analysis showed that the upregulated DEGs were enriched in multiple signaling pathways related to bone metabolism, such as rheumatoid arthritis, VEGF, IL-17, ras signaling pathway, TNF, and MAPK signaling pathway (C). In addition, among the top 20 upregulated DEGs, only COX-2 was enriched in three osteogenic pathways, namely VEGF, IL-17, and TNF signaling pathways. In addition, GSEA reflected that the G007-LK group was positively correlated with lysosome, vascular endothelial growth factor, *Vibrio cholerae* infection, autophagy regulation, oxidative phosphorylation, glycerophospholipid metabolism, spliceosome, and ubiquitin-mediated proteolysis (D). Combining the results of KEGG pathway enrichment analysis and GESA, it can be found that the activation of the VEGF pathway has a greater impact on the G007-LK group. As shown in the details and heat map (E) of the genomic VEGF signaling pathway, the G007-LK group clearly showed a leading subset and enrichment score, indicating that SHED treated with G007-LK has a more important biological significance for osteogenic differentiation.

Example 3 Effects of G007-LK Pretreatment on SHED Combined with Collagen Bone Scaffold on Ectopic Osteogenesis In Vivo I. Materials and Methods 1. Experimental Materials (1) Geistlich Bio-Oss Collagen bone filling material was purchased from Geistlich, Switzerland.
(2) Nude mice were purchased from Southern Medical University.

2. Experimental Methods (1) Establishment of Subcutaneous Ectopic Osteogenesis Model in Nude Mice All animal experiments were approved by the Experimental Animal Ethics Committee of Guangdong Quality Control and Medical Equipment Quarantine Station (approval number: 2020102002). Using a sterile blade under a pre-ultraviolet sterilized clean bench, two 100 mg Geistlich Bio-Oss® bone powders were divided into 4 small bone powder blocks of approximately 25 mg. Two groups were designed for in vivo studies: (1) SHED control group: SHED+Geistlich Bio-Oss® collagen bone pretreated with mineralization induction medium for 7 days; (2) G007-LK group: SHED+Geistlich Bio-Oss® collagen bone pretreated with mineralization induction medium containing 0.3 µM G007-LK for 7 days; 4 replicates per group. On the 7th day, SHED pre-cultured with mineralization induction medium containing or without G007-LK were digested with 0.25% trypsin, resuspended, and inoculated on bone powder blocks at a density of $1\times10^6$/block. After 2 hours of in vitro culture, the cell attachment was observed under a microscope.

Use a 5 mL syringe to absorb the 1% (volume fraction) sodium pentobarbital saline sterile solution filtered by the filter, calculate the injection dose (30 mg/kg), inject the anesthetic intraperitoneally into the nude mouse, and observe the anesthesia. When the nude mouse has a sluggish corneal reflex and systemic muscle relaxation, it is considered to be in anesthesia. After the nude mouse is anesthetized, use 75% alcohol and iodine to cross-disinfect the skin of the surgical area twice, and inject a small amount of sterile 1% lidocaine hydrochloride subcutaneously. A 1.5-2 cm incision was made on one side of the nude mouse's back 1 cm away from the midline, and the epidermis was lifted and bluntly separated to fully separate the area where the bone powder block was to be implanted. The nude mouse is marked with an ear tag number, and the corresponding sample material (SHED control group, G007-LK pretreatment group) is implanted subcutaneously, and the skin is sutured. After surgery, the mice were kept warm with an electric blanket for 0.5 h and properly returned to the cage after waking up. A 1.2 μM G007-LK saline solution was prepared and sterile filtered. Every 3 days after surgery, 100 μL was injected into the subcutaneous position of the ectopic bone formation in the experimental group, and the control group was injected with the same amount of sterile saline. The administration lasted for 2 weeks. The samples were collected 8 weeks after surgery and related tests were performed.

(2) Analysis of Bone Regeneration and Bone Defect Healing

Micro-Computed Tomography (Micro-CT), also known as μCT, has a very high resolution compared to the CT currently used in clinical practice, and can reach the micron processing level. Eight weeks after the material was implanted into the subcutaneous ectopic osteogenesis model of nude mice, all nude mice were properly killed in accordance with the requirements of animal welfare and ethics: after anesthesia with 2% sodium pentobarbital, the experimental animals were killed by cervical dislocation, and the subcutaneous bone blocks of nude mice were completely removed and stored in a short-term medium in an appropriate amount of 70% ethanol or 4% paraformaldehyde universal tissue fixative. The tissue samples were scanned using a Bruker-Micro-CT instrument with a pixel resolution of 10 μm. The data were reconstructed using DataViewer software, and the "region of interest" was set according to the size of the sample after scanning. The images were reconstructed into tomograms using CT Vox software, and the bone volume percentage (Bone Volume/Tissue Volume, BV/TV) and bone surface density (Bone Surface/Tissue Volume, BS/TV) were calculated using CTAn 1.17.7.2 software.

3) Tissue Section Staining

The specimens were immersed in 4% paraformaldehyde universal tissue fixative for 7 days, and then treated with a finished EDTA (pH 7.4) decalcification solution for 30 days. The decalcified samples were dehydrated and embedded in paraffin. The largest tissue sample section was sliced, 5 μm thick, and placed on a glass slide, dried, and dewaxed before hematoxylin-eosin (H&E) staining, modified Masson trichrome staining, and OCN staining. New bone formation was observed under an upright microscope, and photos were taken. Semi-quantitative analysis was performed using Image J image processing software.

4) Statistical Analysis

All data were expressed as mean±standard deviation. Two independent sample t-tests were performed using SPSS 26.0 statistical software. The test level was α=0.05, and P<0.05 indicated that the difference was statistically significant.

2. Results

1. Micro-CT Scanning and New Bone Formation Analysis Results

Figure 12:
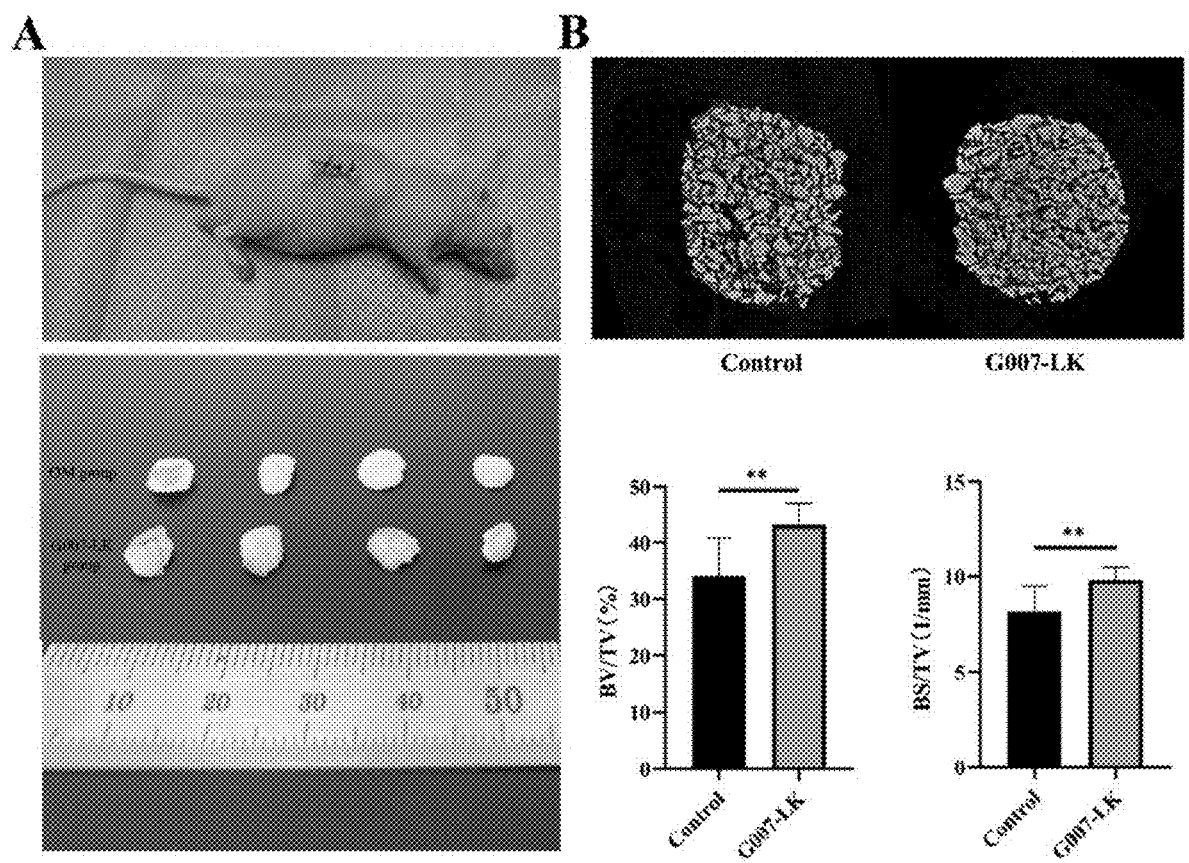
FIG. 12 shows that G007-LK promotes subcutaneous ectopic osteogenesis in nude mice, A of FIG. 12 shows the appearance of subcutaneous ectopic osteogenesis tissue samples in vivo and after sampling, and B of FIG. 12 shows the quantitative analysis of Micro-CT data (**$P<0.01$).

From the in vitro cell experiment, it can be obtained that 0.3 μM G007-LK treatment has the greatest effect on promoting SHED osteogenic differentiation, so the present application selects this concentration for in vivo animal research. In order to verify the osteogenic effect of G007-LK in vivo, the present application established a nude mouse subcutaneous ectopic osteogenesis model. When the tissue samples were taken after 8 weeks, it was intuitively seen that the volume of the tissue blockin the SHED control group was smaller than that in the G007-LK group (FIG. 12A). As shown in FIG. 12B, the image of the Micro-CT scan shows that the maximum cross-sectional density of the subcutaneous ectopic osteogenic tissue in the G007-LK group is higher than that in the SHED control group. The data were analyzed by CTAn software, and the results showed that the bone volume percentage (BV/TV) and bone surface density (BS/TV) of the G007-LK group were higher than those of the SHED control group, and the difference was statistically significant (P<0.05). The above results indicate that compared with the SHED control group, more new bone formation can be seen in the subcutaneous ectopic osteogenesis model of the SHED group pretreated with G007-LK.

2. H&E Staining Results

Figure 13:
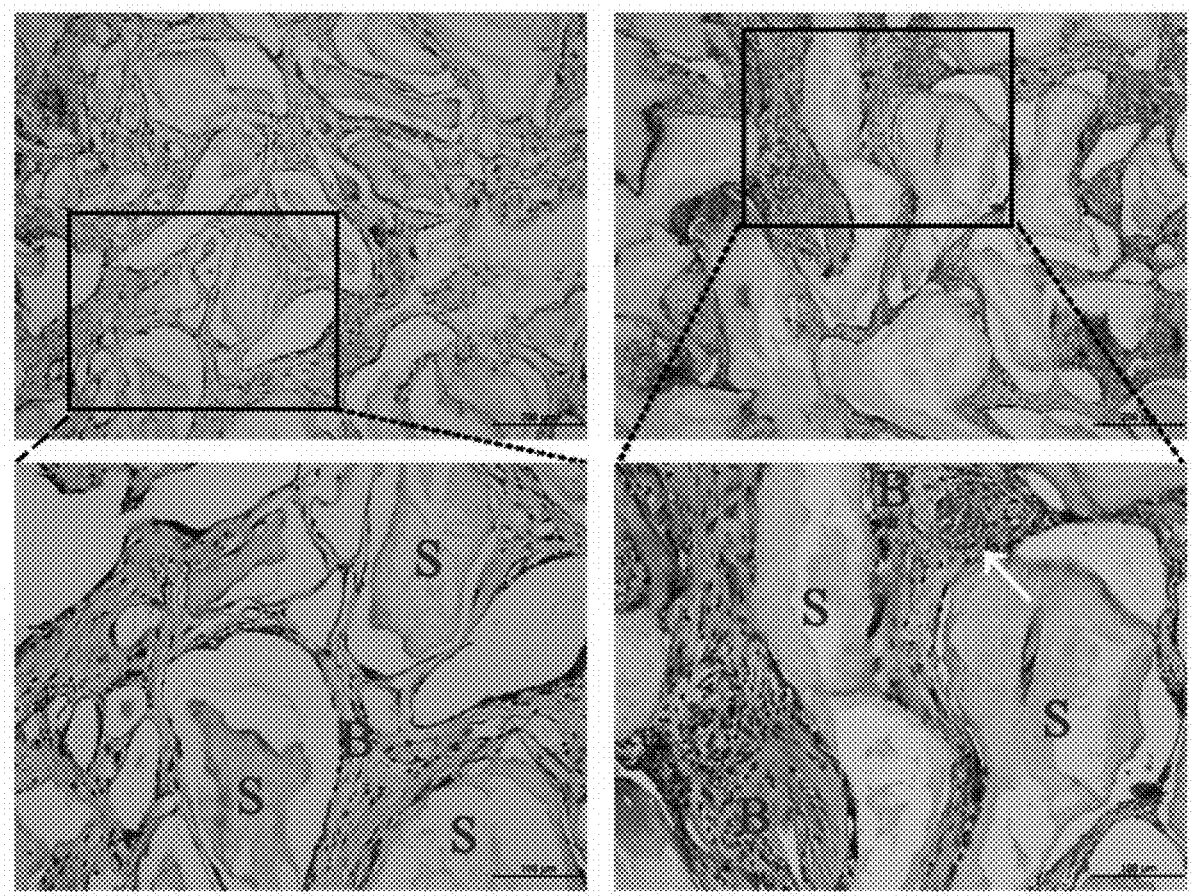
FIG. 13 shows the HE staining results of subcutaneous ectopic osteogenesis tissue sections in nude mice in the control group and the G007-LK group, in which S stands for Scaffold, B stands for Bone, and the arrow points to the blood vessel.

In the representative sections of the SHED control group and the G007-LK pretreated SHED group, the H&E staining results showed that the scaffold material in the control group was mainly surrounded by fibrotic connective tissue, while in the G007-LK group, newly formed bone and blood vessels were observed around the scaffold material (FIG. 13).

3. Modified Masson Trichrome Staining Results

Figure 14:
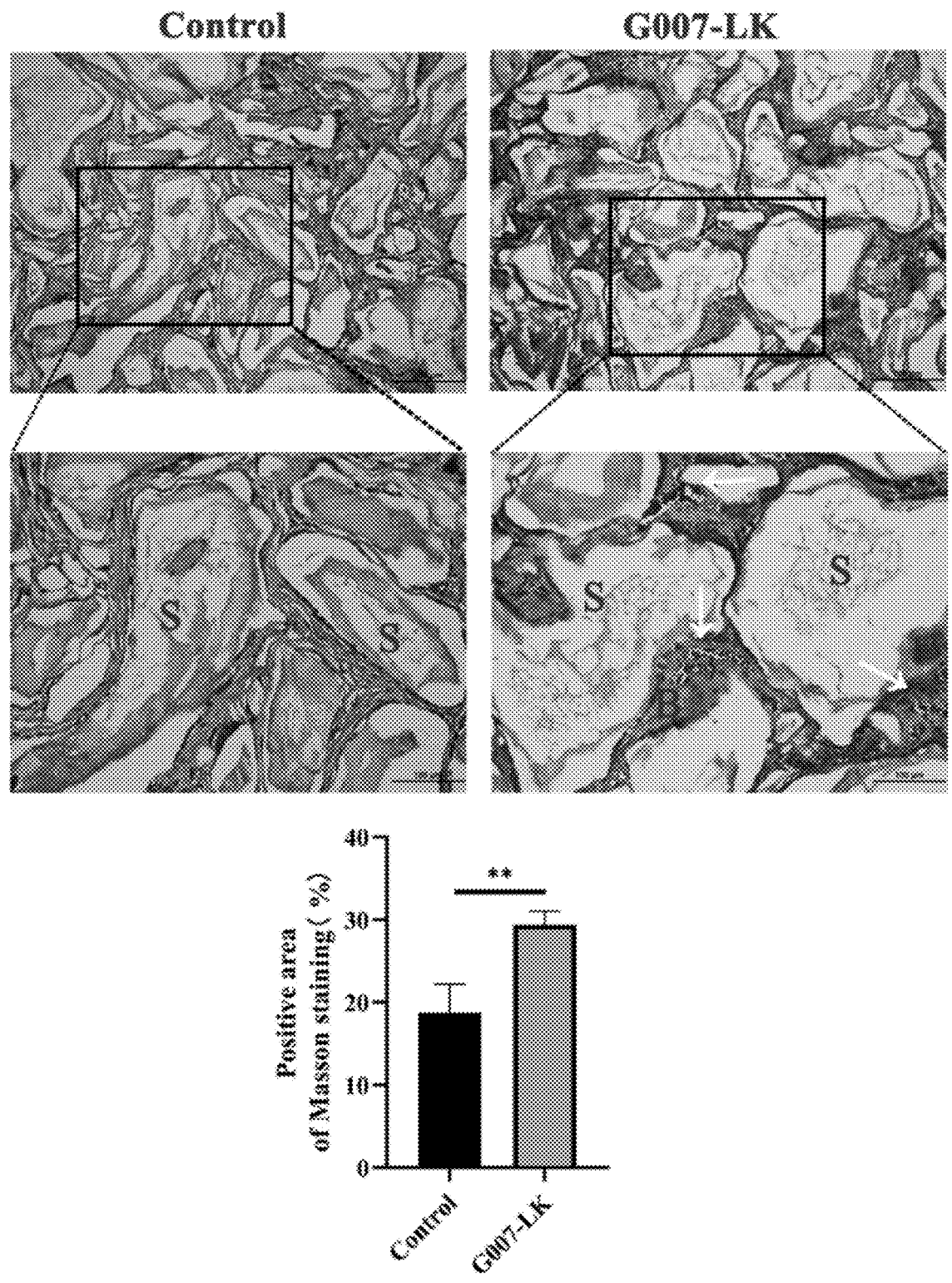
FIG. 14 shows the results of Masson staining and Image J analysis of subcutaneous ectopic osteoblast tissue sections of nude mice in the control group and G007-LK group, in which S stands for Scaffold, B stands for Bone, and the arrows point to blood vessels.

The modified Masson trichrome staining method is mainly used to distinguish collagen fibers from muscle fibers, in which collagen fibers appear blue, cytoplasm, muscle fibers, red blood cells, cellulose and keratin appear red, and nuclei appear blue-brown. In this example, the modified Masson trichrome staining was observed in representative sections of the SHED control group and the G007-LK pretreated SHED group. The results are shown in FIG. 14. The G007-LK group showed more mature collagen fiber formation relative to the control group, and more new blood vessel formation was observed. The semi-quantitative analysis results of the positive staining area by Image J image processing software were consistent with the observation results. The positive staining area of the G007-LK group was higher than that of the control group, and the difference was statistically significant (P<0.05).

4. OCN Staining Results

Figure 15:
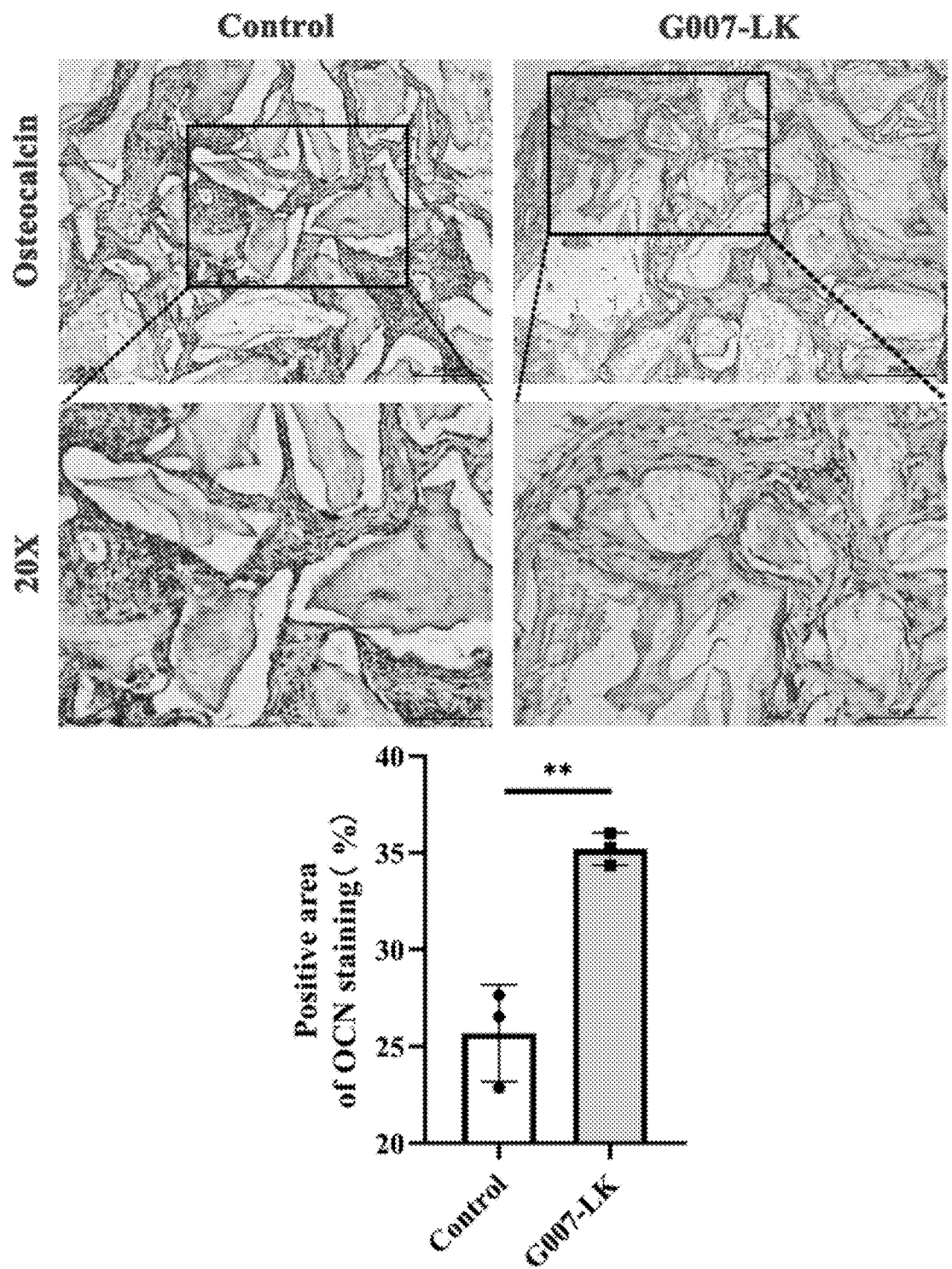
FIG. 15 shows the results of OCN staining and Image J analysis of subcutaneous ectopic osteoblast tissue sections of nude mice in the control group and G007-LK group.

Representative sections of the control group and G007-LK group were immunohistochemically stained to observe the expression of OCN. The results are shown in FIG. 15. The OCN staining degree of the G007-LK group was deeper than that of the control group. The semi-quantitative analysis results of the positive staining area by Image J image processing software were consistent with the observation results. The positive staining area of the G007-LK group was higher than that of the control group, and the difference was statistically significant (P<0.05). This shows that the G007-LK group expressed more osteocalcin.

In summary, the present application adopts the subcutaneous ectopic osteogenesis model of nude mice back to carry out in vivo animal experiments. A large number of studies have shown that the subcutaneous ectopic osteogenesis model of the back lacks muscle tissue, has poor blood supply and poor autologous bone regeneration ability, so the subcutaneous ectopic osteogenesis model can be used for bone transplant repair effect analysis. In addition, experiments on nude mice can better solve the problem of immune rejection, and many studies have shown that SHED has the advantage of low immunogenicity. In addition, the Bio- Oss® collagen bone scaffold used in this embodiment is a scaffold material that has been widely used in clinical practice and has good biocompatibility, indicating that the method used in this embodiment experiment can effectively avoid the effect of immune rejection reaction in animals on ectopic osteogenesis.

The present application selects 7 days as the time point for 0.3 µM G007-LK to induce SHED in vitro. Many studies have shown that the expression of RUNX2 is specific in different stages of the osteogenic differentiation process. It is weakly expressed in undifferentiated MSCs, and its expression begins to increase in pre-osteoblasts, with the peak expression appearing at the stage when osteoblasts are about to mature. It can be seen from Example 1 of the present application that after SHED was induced by 0.3 µM G007-LK for 4 days, the expression of RUNX2 was significantly upregulated compared with the control group. At 7 days, the significance of the difference in RUNX2 expression of SHED in the G007-LK group began to decrease. Therefore, it is speculated that 0.3 µM G007-LK in vitro induction for 7 days can achieve a better effect in promoting SHED osteogenic differentiation. Yang et al. explored the role of the nanomaterial Fullerol in promoting the osteogenic differentiation of adipose-derived MSCs, and Tae et al. used 7 days as the induction time in their experiments to evaluate the cell viability and osteogenic differentiation potential of cell spheroids composed of gingival stem cells and bone marrow stem cells in different proportions cultured in concave microwells, indicating the rationality of the selection of in vitro induction time in this example.

In this example, Micro-CT analysis showed that the G007-LK group formed more new bone than the control group. Compared with the control group, the G007-LK group had higher bone volume percentage (BV/TV) and bone surface density (BS/TV), and the differences were statistically significant ($P<0.05$). H&E staining and modified Masson trichrome staining results showed that compared with the control group, in addition to the formation of more mature bone tissue, more neovascularization was observed in the G007-LK group. Studies have shown that in the skeletal system, blood vessels can regulate the formation and regeneration of bone by providing a vascular niche for stem cells. In addition, the immunohistochemical results of OCN staining also showed that the tissue sections of the G007-LK group expressed more osteocalcin. The above results all indicate that the pretreatment of G007-LK can promote osteogenesis in SHED in vivo. By comparing the in vitro cell experimental results of Example 1, it can be found that they are consistent with the in vivo experimental results of this example, suggesting that G007-LK can be used as a potential osteogenic drug to induce a more favorable microenvironment for osteogenesis, thereby better promoting bone repair. The tissue-engineered bone after SHED pretreatment with G007-LK has obvious ectopic osteogenesis ability.

In vivo experiments showed that G007-LK pre-treated SHED for 7 days combined with Geistlich Bio-Oss® collagen bone scaffold can enhance the in vivo osteogenesis of SHED and promote the subcutaneous ectopic osteogenesis in nude mice, indicating that G007-LK has good osteoinductivity and is a potential osteogenic drug.

Example 4 Comparison of the Ability of G007-LK and XAV939 to Promote Osteogenic Differentiation of SHED 1. Experimental Methods Alizarin red S was used to qualitatively analyze the results of mineralized nodules staining, and cetylpyridinium chloride (CPC) was used to semi-quantitatively analyze the ability of XAV-939 to induce SHED to form mineralized nodules.

(1) Alizarin Red S Staining

SHED cells were routinely digested, counted, and resuspended using 0.25% trypsin, and seeded in a 48-well plate at a seeding density of $2.5 \times 10^4$/well. Four replicate wells were set up in each group. When the cell growth density reached 70%-80%, the cell culture medium was replaced with normal proliferation medium (PM), osteogenic differentiation induction medium (OM), and mineralization induction medium containing 100 nM and 500 nM XAV-939 (10 mM sodium β-glycerophosphate, 10 nM dexamethasone, 50 µg/mL vitamin C) (osteogenic induced medium, OM). The medium was changed every 3 days. The medium was discarded on the 14th day, and the cells were washed 3 times with PBS buffer. 200 µL of 4% paraformaldehyde fixative was added to each well and fixed for 20-30 minutes. After fixation, each group of experimental wells was washed three times with deionized water. According to the product instructions, 150 µL of 1% (volume fraction) Alizarin Red S dye solution with a pH of 4.2 was added. The wells were kept at room temperature and away from light for 5 min to 10 min, then the dye solution was aspirated. The wells were washed repeatedly with deionized water until the supernatant was colorless or the color did not change, dried at room temperature, and observed and compared under a stereo microscope.

(2) Semi-Quantitative Analysis of Mineralized Nodules

Calculation: Weigh an appropriate amount of cetylpyridinium chloride powder to prepare a 10% (volume fraction) CPC solution. Add 200 µL of CPC solution to each well of the Alizarin Red S-stained plate after observation and recording. Place the plate on a shaker and shake for 30 min to 1 h until the mineralized nodules are completely eluted. Take 20 µL of the eluate from each well and add it to a 96-well plate, dilute it 10 times with CPC solution. That is, 180 µL of new CPC solution was added to the 96-well plate in each experimental group. 200 µL of CPC solution was added to the zero-adjusted well and finally, the fully automatic multifunctional enzyme-linked immunosorbent assay was used to measure the concentration of the CPC solution at a wavelength of 562 nm.

2. Results

Mineralized Nodule Staining and Semi-Quantitative Analysis Results

Figure 16:
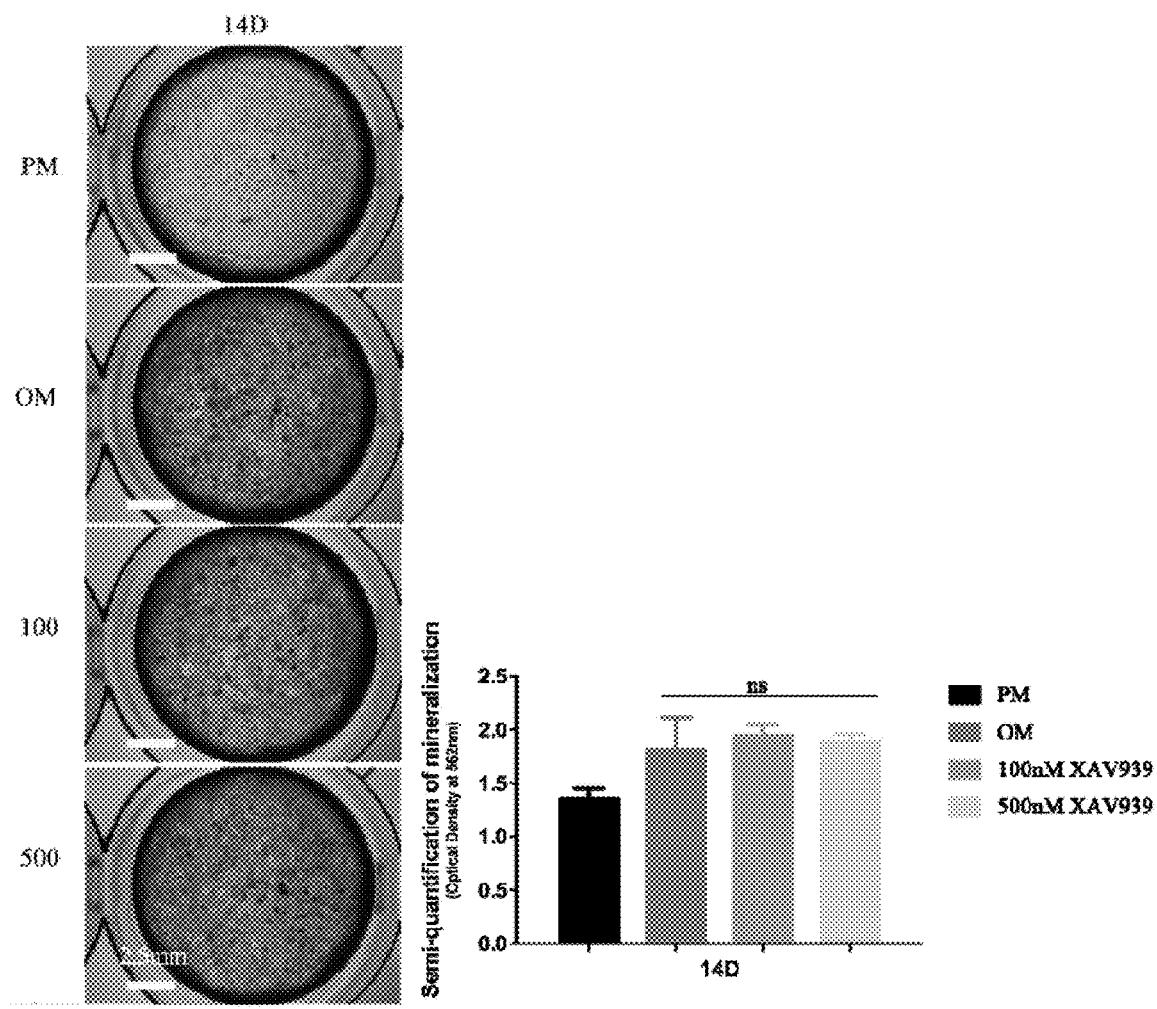
FIG. 16 shows the effects of different concentrations of XAV939 on SHED mineralization (Alizarin red staining and semi-quantitative histogram of calcified nodules); ns p>0.05. Comparison among the OM group, 100 nM group and 500 nM group.

After SHED and XAV-939 were co-cultured for 14 days, Alizarin Red S staining was performed. The results are shown in FIG. 16. More and larger mineralized nodules were formed in the OM, 100 nM, and 500 nM XAV-939 groups, while fewer mineralized nodules were formed in the negative control group (PM group). The results of semi-quantitative analysis of cetylpyridinium chloride showed that there was no statistically significant difference in mineralization between the 100 nM and 500 nM XAV-939 groups and the OM group ($P>0.05$), indicating that XAV939 had no significant effect on promoting mineralization in deciduous tooth pulp stem cells (SHED). However, significant mineralization differences were observed in G007-LK at 12 days, and the results were statistically significant ($P<0.05$). Compared with XAV-939, it has a significant ability to induce SHED to form mineralized nodules and promote osteogenic differentiation.

What is claimed is:

1. A method for inducing osteogenic differentiation of dental mesenchymal stem cells, comprising: inducing osteogenic differentiation of dental mesenchymal stem cells using an osteogenic differentiation medium containing G007-LK, wherein a chemical structure of G007-LK is as follows:

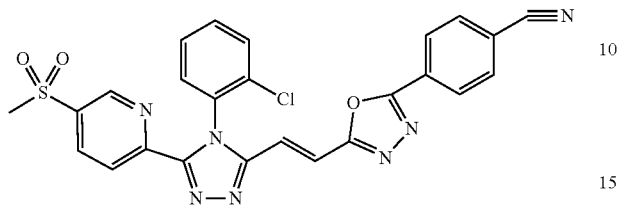

G007-LK has a working concentration of 0.3 μM, and the dental mesenchymal stem cells are deciduous dental pulp stem cells separated from deciduous teeth.

* * * * *